United States Patent
Mori et al.

(10) Patent No.: US 10,857,499 B2
(45) Date of Patent: *Dec. 8, 2020

(54) PLUGGED HONEYCOMB STRUCTURE

(71) Applicant: NGK INSULATORS, LTD., Nagoya (JP)

(72) Inventors: Kazuya Mori, Nagoya (JP); Mitsuhiro Ito, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 581 days.

This patent is subject to a terminal disclaimer.

(21) Appl. No.: 15/704,380

(22) Filed: Sep. 14, 2017

(65) Prior Publication Data

US 2018/0099240 A1    Apr. 12, 2018

(30) Foreign Application Priority Data

Oct. 11, 2016 (JP) .................. 2016-200347

(51) Int. Cl.
*B01D 46/24* (2006.01)
*F01N 3/28* (2006.01)
*F01N 3/022* (2006.01)

(52) U.S. Cl.
CPC ....... *B01D 46/247* (2013.01); *B01D 46/2474* (2013.01); *F01N 3/2828* (2013.01);
(Continued)

(58) Field of Classification Search
None
See application file for complete search history.

(56) References Cited

U.S. PATENT DOCUMENTS 8,852,715 B2    10/2014    Naruse et al.
2011/0230335 A1*  9/2011   Yamada .............. C04B 35/6263
                                                           502/100
(Continued)

FOREIGN PATENT DOCUMENTS

| EP | 2 380 647 B1 | 6/2014 |
| JP | 2014-200741 A1 | 10/2014 |
| JP | 2015-029939 A1 | 2/2015 |

OTHER PUBLICATIONS

U.S. Appl. No. 15/704,393, filed Sep. 14, 2017, Kazuya Mori.
German Office Action (Application No. 10 2017 008 767.9) dated Apr. 13, 2018.

*Primary Examiner* — Christopher P Jones
*Assistant Examiner* — Phillip Y Shao
(74) *Attorney, Agent, or Firm* — Burr & Brown, PLLC

(57) ABSTRACT

The plugged honeycomb structure includes a plurality of honeycomb segments, a bonding layer, and plugging portions which plug open ends of cells of each honeycomb segment, and in the honeycomb segment, at least two types of cells having different sectional shapes are formed to constitute predetermined repeated arrangement patterns, and in rim circumferential wall cells including rims of the cells surrounded with partition walls and segment circumferential walls, an inflow open area of each corner rim circumferential wall cell disposed in each corner portion of the honeycomb segment is 1.1 times or more as large as an average inflow open area of non-corner rim circumferential wall cells arranged in portions other than the corner portions, or an outflow open area of the corner rim circumferential wall cell is 1.1 times or more as large as an average outflow open area of the non-corner rim circumferential wall cells.

6 Claims, 24 Drawing Sheets

(52) U.S. Cl.
CPC ........ *B01D 2046/2481* (2013.01); *B01D 2046/2492* (2013.01); *B01D 2046/2496* (2013.01); *B01D 2279/20* (2013.01); *F01N 3/0222* (2013.01); *F01N 2330/06* (2013.01); *F01N 2330/32* (2013.01); *F01N 2330/34* (2013.01); *F01N 2330/48* (2013.01)

(56) References Cited

U.S. PATENT DOCUMENTS

2014/0298779 A1  10/2014  Miyairi
2015/0037532 A1   2/2015  Shibata et al.

\* cited by examiner (a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

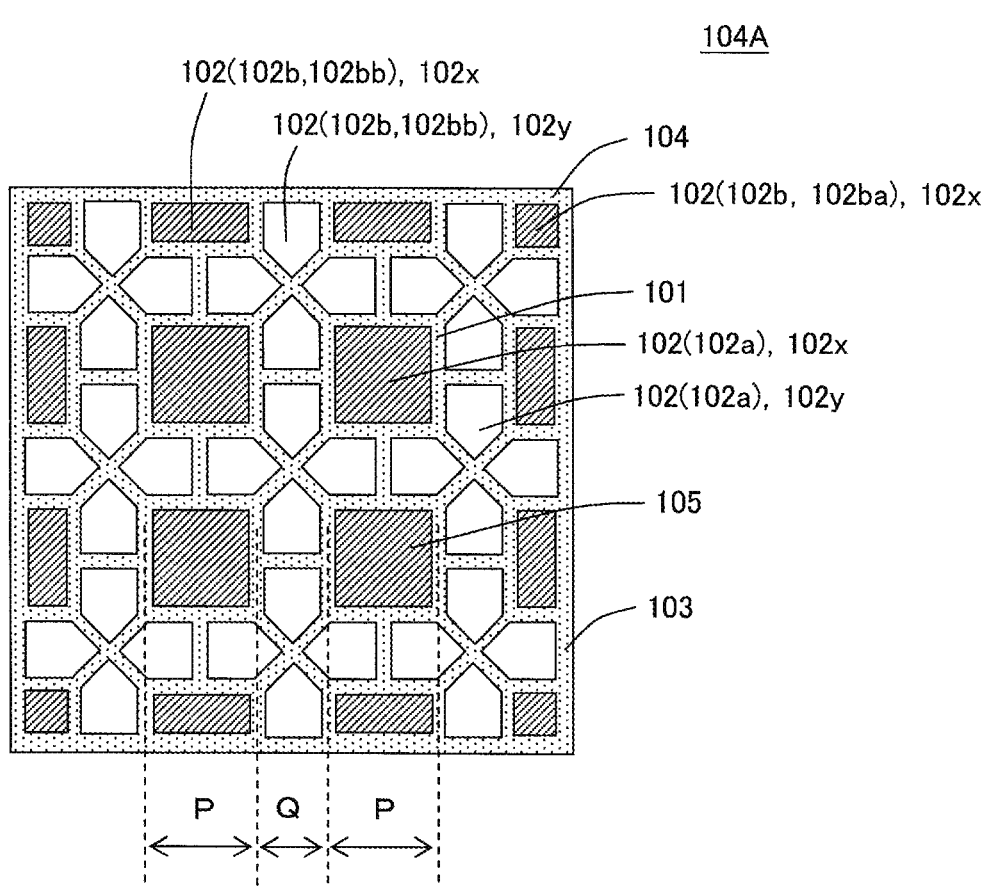

PLUGGED HONEYCOMB STRUCTURE

The present application is an application based on JP-2016-200347 filed on Oct. 11, 2016 with the Japan Patent Office, the entire contents of which are incorporated herein by reference.

BACKGROUND OF THE INVENTION

Field of the Invention

The present invention relates to a plugged honeycomb structure, and more particularly, it relates to a plugged honeycomb structure which is capable of inhibiting increase of pressure loss due to deposition of incombustible particulate matter while maintaining isostatic strength.

Description of the Related Art

From the viewpoints of influence on the global environment, and resource saving, improvement of car fuel efficiency has been required in recent years. Consequently, internal combustion engines such as a direct injection type gasoline engine and a diesel engine, which are excellent in heat efficiency, have a tendency to be used as power sources for cars.

On the other hand, these internal combustion engines have the problem of generation of cinders during combustion of fuel. From the viewpoint of the atmospheric environment, there are required countermeasures to remove harmful components included in an exhaust gas and to simultaneously prevent particulate matter (hereinafter referred to as "PM" sometimes) such as soot or ash from being discharged to the atmospheric air. Combustible particulate matter such as the soot is burnt to oxidize, and becomes carbon dioxide, and a part of incombustible particulate matter becomes ash.

In particular, regulations on removal of the PM emitted from the diesel engine have a tendency to be worldwide strengthened. Furthermore, attention is attracted to use of a wall flow type exhaust gas purifying filter of a honeycomb structure as a trapping filter (hereinafter referred to as "DPF (a diesel particulate filter)" sometimes) to remove the PM, and various systems have been suggested. The above DPF is usually a structure in which porous partition walls define a plurality of cells forming through channels for a fluid, and the cells are alternately plugged, whereby the porous partition walls forming the cells perform a function of the filter. A pillar-shaped structure in which the porous partition walls define the plurality of cells will be referred to as "a honeycomb structure" sometimes. Furthermore, the honeycomb structure in which open ends of the formed cells are plugged with plugging portions will be referred to as "a plugged honeycomb structure" sometimes. The plugged honeycomb structure is broadly used as a trapping filter such as the DPF. When an exhaust gas containing the particulate matter flows into the plugged honeycomb structure from an inflow end face (a first end face) of the plugged honeycomb structure and when the exhaust gas passes through the partition walls, the particulate matter in the exhaust gas is filtered, and the purified exhaust gas is emitted from an outflow end face (a second end face) of the plugged honeycomb structure.

Heretofore, as to a cell shape of the plugged honeycomb structure, there have been quadrangular cells, hexagonal cells, HAC cells (cells having a combination of an octagonal shape and a quadrangular shape), and the like. In recent years, there have been advanced development of novel plugged honeycomb structures in which variant cells are combined and in which positions to be plugged are contrived (e.g., see Patent Documents 1 and 2). According to such plugged honeycomb structures, while decreasing both of pressure loss in an initial use stage and pressure loss during PM deposition, it is possible to inhibit generation of cracks during PM burning and to deposit more ash and the like in the partition walls.

[Patent Document 1] JP-A-2014-200741
[Patent Document 2] JP-A-2015-029939

SUMMARY OF THE INVENTION

In case of using, as a DPF, a plugged honeycomb structure having a special cell shape as in Patent Document 1 or 2, the plugged honeycomb structure is usually formed in a round pillar shape having a specific size and having, for example, round end faces. As one method of manufacturing the round pillar-shaped plugged honeycomb structure, the following manufacturing method has been suggested. Initially, there are prepared a plurality of honeycomb segments each having partition walls defining special cells and segment circumferential walls covering circumferences of the special cells. Next, the plurality of honeycomb segments are bonded by using a bonding material, to prepare a bonded body of the honeycomb segments (hereinafter referred to as "the honeycomb segment bonded body"). Next, a circumference of the honeycomb segment bonded body is ground into an optional shape, and the circumference is further subjected to a coating treatment, to manufacture the plugged honeycomb structure. The plugged honeycomb structure manufactured by this method will hereinafter be referred to as "the plugged honeycomb structure of a segmented structure" sometimes.

Heretofore, in the plugged honeycomb structure of the segmented structure, it has not especially been considered that there is a problem as to "a cell arrangement" between the honeycomb segments of the honeycomb segment bonded body. For example, when all the cells of the plugged honeycomb structure have the same quadrangular shape, a repeated minimum unit of the cells is one cell. Consequently, in such a plugged honeycomb structure, "the cell arrangement" in the honeycomb segment has not especially been considered to have any problem. However, in the plugged honeycomb structure having such a special cell shape as in Patent Document 1 or 2, it has become clear that shapes of outermost circumferential cells defined by segment circumferential walls of each honeycomb segment have a large influence on pressure loss. Furthermore, when the above-mentioned shapes of the outermost circumferential cells of each honeycomb structure are not contrived, increase of the pressure loss of the plugged honeycomb structure becomes conspicuous.

The present invention has been developed in view of these problems of conventional technologies. According to the present invention, there is provided a plugged honeycomb structure which is capable of inhibiting increase of pressure loss due to deposition of incombustible particulate matter while maintaining isostatic strength.

According to the present invention, there is provided a plugged honeycomb structure as follows.

According to a first aspect of the preset invention, a plugged honeycomb structure is provided including:

a plurality of prismatic columnar honeycomb segments;

a bonding layer bonding side surfaces of the plurality of honeycomb segments to one another; and plugging portions arranged in open ends of predetermined cells in an inflow end face of each honeycomb segment and arranged in open ends of the residual cells in an outflow end face thereof, wherein each honeycomb segment has porous partition walls arranged to surround a plurality of cells extending from the inflow end face to the outflow end face, and segment circumferential walls arranged at an outermost circumference, in a cross section of the honeycomb segment which is perpendicular to an extending direction of the cells, at least two types of cells having different shapes are formed to constitute predetermined repeated arrangement patterns, the cells of the honeycomb segment include rim circumferential wall cells, the rim circumferential wall cells are the cells having rims surrounded with the partition walls and the segment circumferential walls, the rim circumferential wall cells include corner rim circumferential wall cells and non-corner rim circumferential wall cells, the corner rim circumferential wall cells are the rim circumferential wall cells arranged in corner portions of the honeycomb segment, the non-corner rim circumferential wall cells are the rim circumferential wall cells arranged in portions other than the corner portions of the honeycomb segment, and an inflow open area $S1_{in}$ of each corner rim circumferential wall cell is 1.1 times or more as large as an average inflow open area $S2_{in}$ of the non-corner rim circumferential wall cells, or an outflow open area $S1_{out}$ of the corner rim circumferential wall cell is 1.1 times or more as large as an average outflow open area $S2_{out}$ of the non-corner rim circumferential wall cells.

According to a second aspect of the preset invention, the plugged honeycomb structure according to the above first aspect is provided, wherein except for a circumferential region of the honeycomb segment where the rim circumferential wall cells are formed, the plugging portions are arranged in the open ends of the cells of the honeycomb segment so that inflow cells including the plugging portions arranged in the open ends of the cells in the outflow end face surround an outflow cell including the plugging portion disposed in the open end of the cell in the inflow end face.

According to a third aspect of the present invention, the plugged honeycomb structure according to the above first or second aspects is provided, wherein a thickness of the segment circumferential wall is from 0.3 to 1.0 mm.

According to a fourth aspect of the present invention, the plugged honeycomb structure according to any one of the above first to third aspects is provided, wherein a thickness of the bonding layer is from 0.5 to 1.5 mm.

According to a fifth aspect of the present invention, the plugged honeycomb structure according to any one of the above first to fourth aspects is provided, wherein the cells include whole rim partition wall cells, the whole rim partition wall cells are the cells having whole rims of the cells which are surrounded with the partition walls in the cross section perpendicular to the cell extending direction, the cells including the plugging portions arranged in the open ends of the cells in the outflow end face are defined as inflow cells, and the cells including the plugging portions arranged in the open ends of the cells in the inflow end face are defined as outflow cells, and a shape of the corner rim circumferential wall cell that is the inflow cell is different from a shape of the whole rim partition wall cell that is the inflow cell, or a shape of the corner rim circumferential wall cell that is the outflow cell is different from a shape of the whole rim partition wall cell that is the outflow cell.

According to a sixth aspect of the present invention, the plugged honeycomb structure according to any one of the above first to fifth aspects is provided, wherein the inflow open area $S1_{in}$ of the corner rim circumferential wall cell is smaller than 4.0 times as large as the average inflow open area $S2_{in}$ of the non-corner rim circumferential wall cells, or the outflow open area $S1_{out}$ of the corner rim circumferential wall cell is smaller than 4.0 times as large as the average outflow open area $S2_{out}$ of the non-corner rim circumferential wall cells.

A plugged honeycomb structure of the present invention is a so-called plugged honeycomb structure of a segmented structure, and an open area of a corner rim circumferential wall cell disposed in each corner portion of each honeycomb segment is larger than an open area of a non-corner rim circumferential wall cell as much as a specific size or more. In other words, an inflow open area $S1_{in}$ of each corner rim circumferential wall cell is 1.1 times or more as large as an average inflow open area $S2_{in}$ of the non-corner rim circumferential wall cells, or an outflow open area $S1_{out}$ of the corner rim circumferential wall cell is 1.1 times or more as large as an average outflow open area $S2_{out}$ of the non-corner rim circumferential wall cells. According to the plugged honeycomb structure of the present invention, it is possible to inhibit increase of pressure loss due to deposition of incombustible particulate matter while maintaining isostatic strength.

BRIEF DESCRIPTION OF THE DRAWINGS

FIG. 26 is a plan view schematically showing a plugged honeycomb segment for use in a plugged honeycomb structure of Comparative Example 1 and seen from an inflow end face side.

DESCRIPTION OF THE PREFERRED EMBODIMENTS

Figure 1:
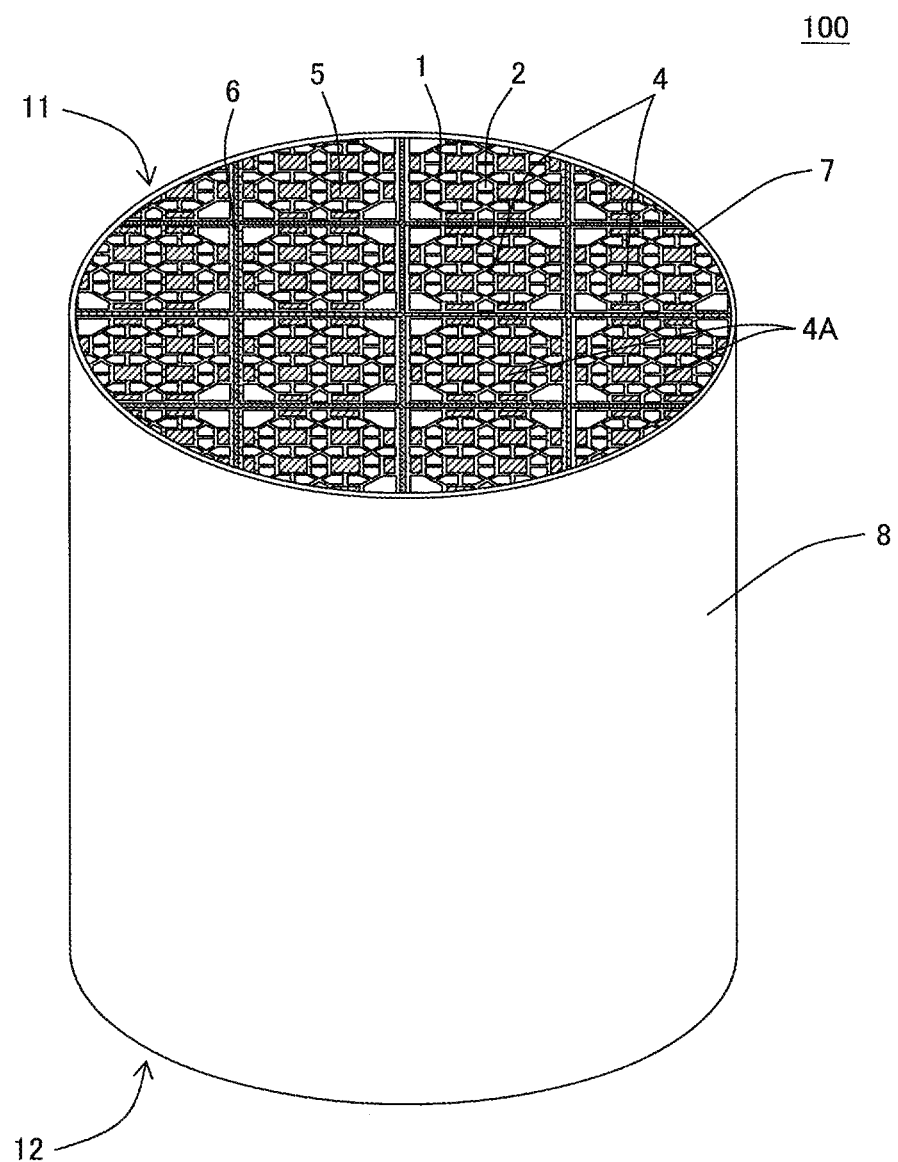
FIG. 1 is a perspective view schematically showing a first embodiment of a plugged honeycomb structure of the present invention and seen from an inflow end face side.

Hereinafter, embodiments of the present invention will be described, but the present invention is not limited to the following embodiments. Therefore, it should be understood that the following embodiments to which changes, improvements and the like are suitably added also fall in the scope of the present invention on the basis of ordinary knowledge of a person skilled in the art without departing from the gist of the present invention.

(1) Plugged Honeycomb Structure:

As shown in FIG. 1 to FIG. 5, a first embodiment of a plugged honeycomb structure of the present invention is a plugged honeycomb structure 100 including a plurality of honeycomb segments 4, a bonding layer 6, and plugging portions 5. The plugged honeycomb structure 100 of the present embodiment is a so-called plugged honeycomb structure of a segmented structure. The plugged honeycomb structure 100 further includes, at its circumference, an outer wall 8 disposed to surround the plurality of honeycomb segments 4. The plugged honeycomb structure 100 of the present embodiment is suitably utilizable as a trapping filter to remove particulate matter included in an exhaust gas.

Figure 2:
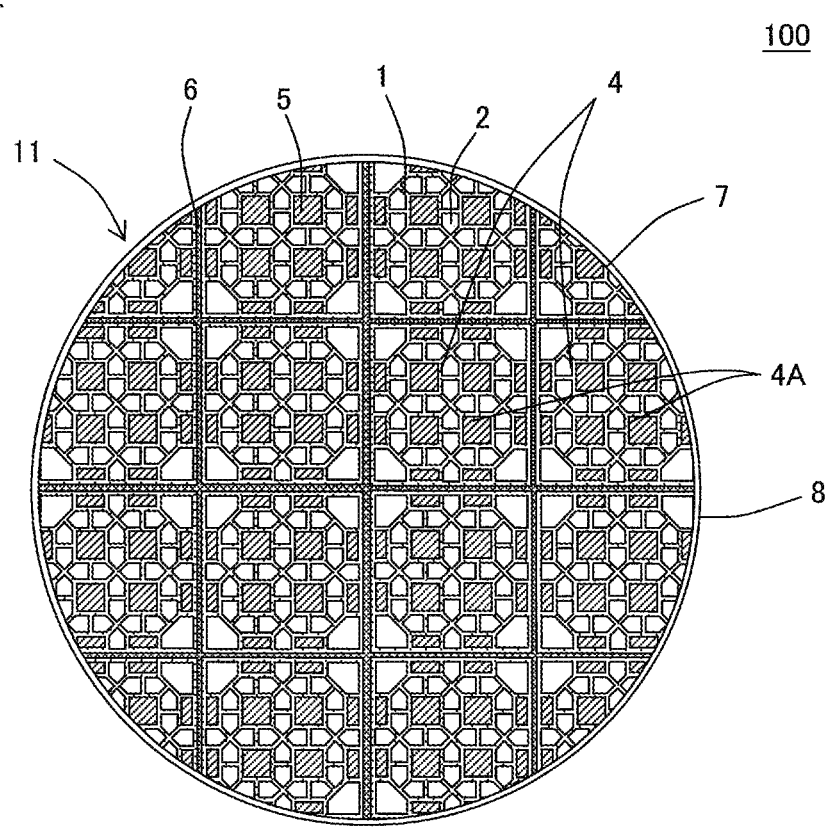
FIG. 2 is a plan view schematically showing the first embodiment of the plugged honeycomb structure of the present invention and seen from the inflow end face side.
Figure 3:
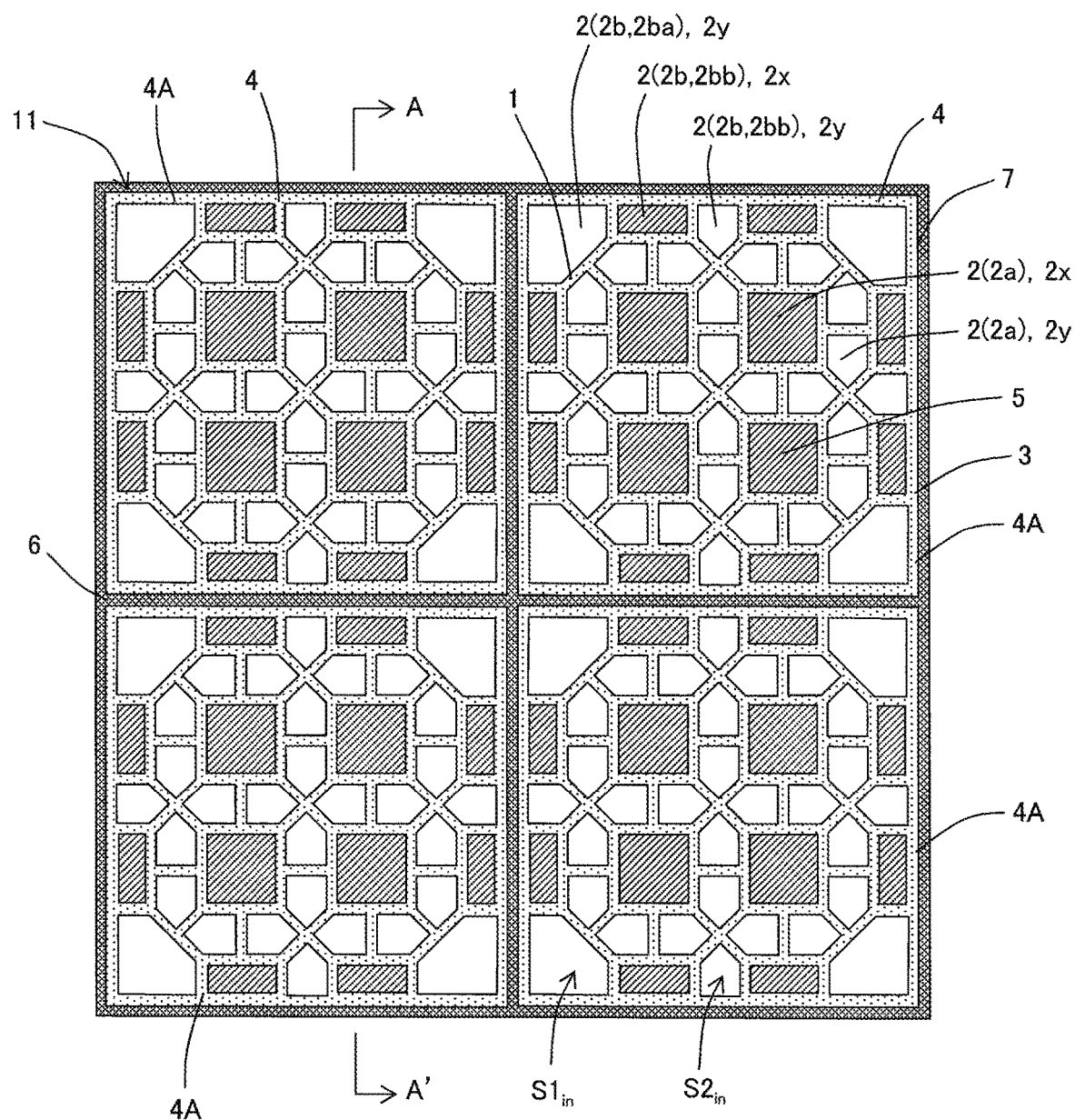
FIG. 3 is an enlarged plan view of an enlarged part of an inflow end face of the plugged honeycomb structure shown in FIG. 1.
Figure 4:
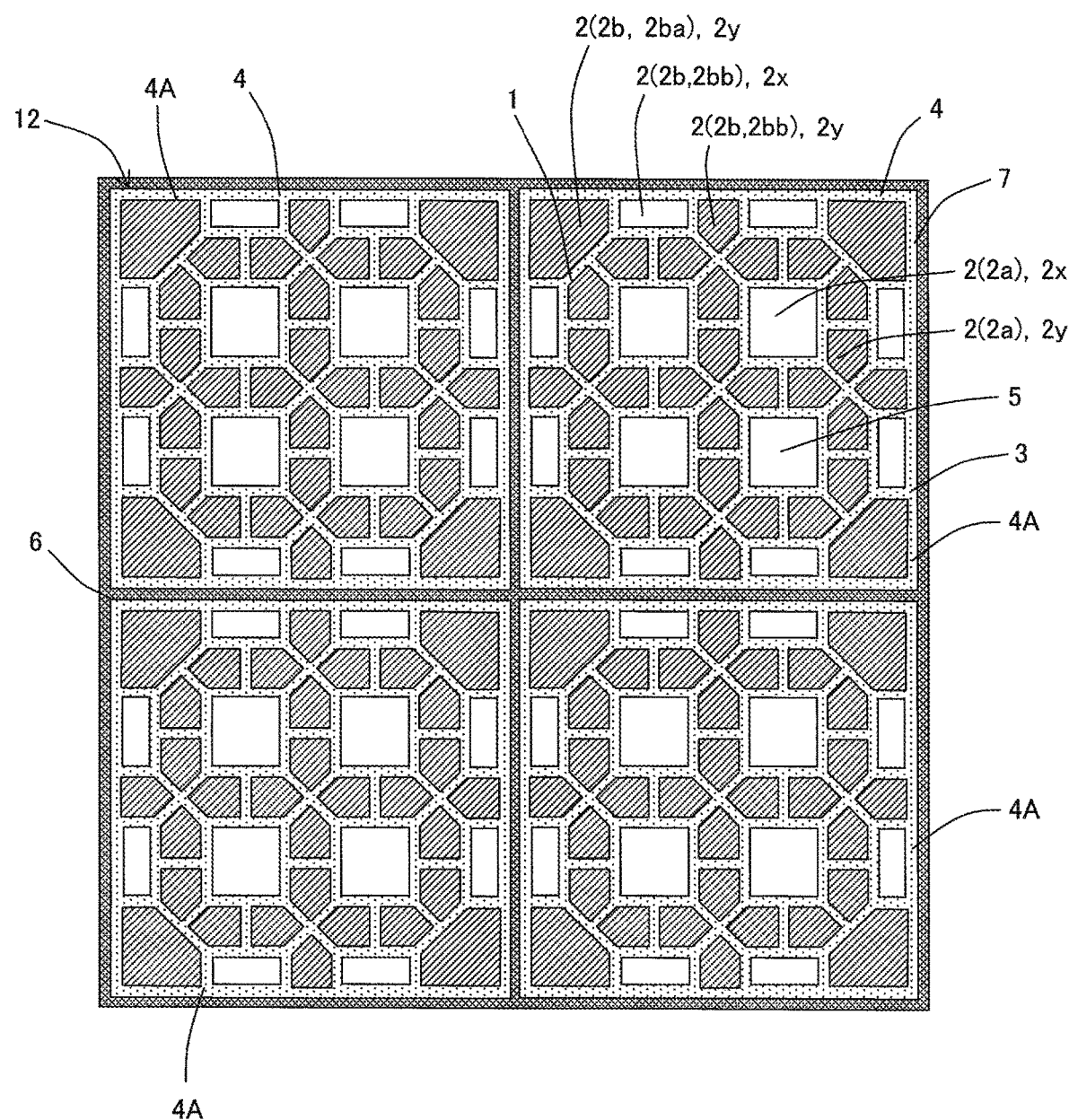
FIG. 4 is an enlarged plan view of an enlarged part of an outflow end face of the plugged honeycomb structure shown in FIG. 1.
Figure 5:
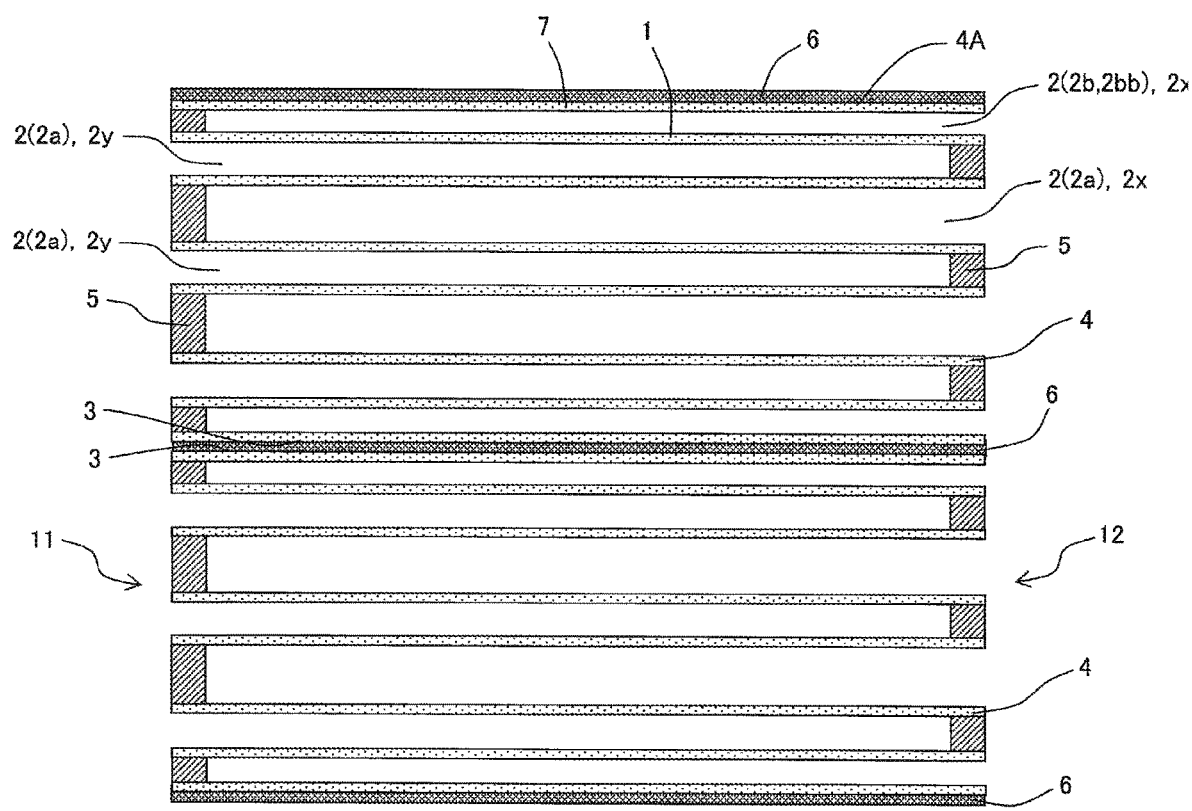
FIG. 5 is a cross-sectional view schematically showing a cross section taken along the A-A' line of FIG. 3.
Figure 6:
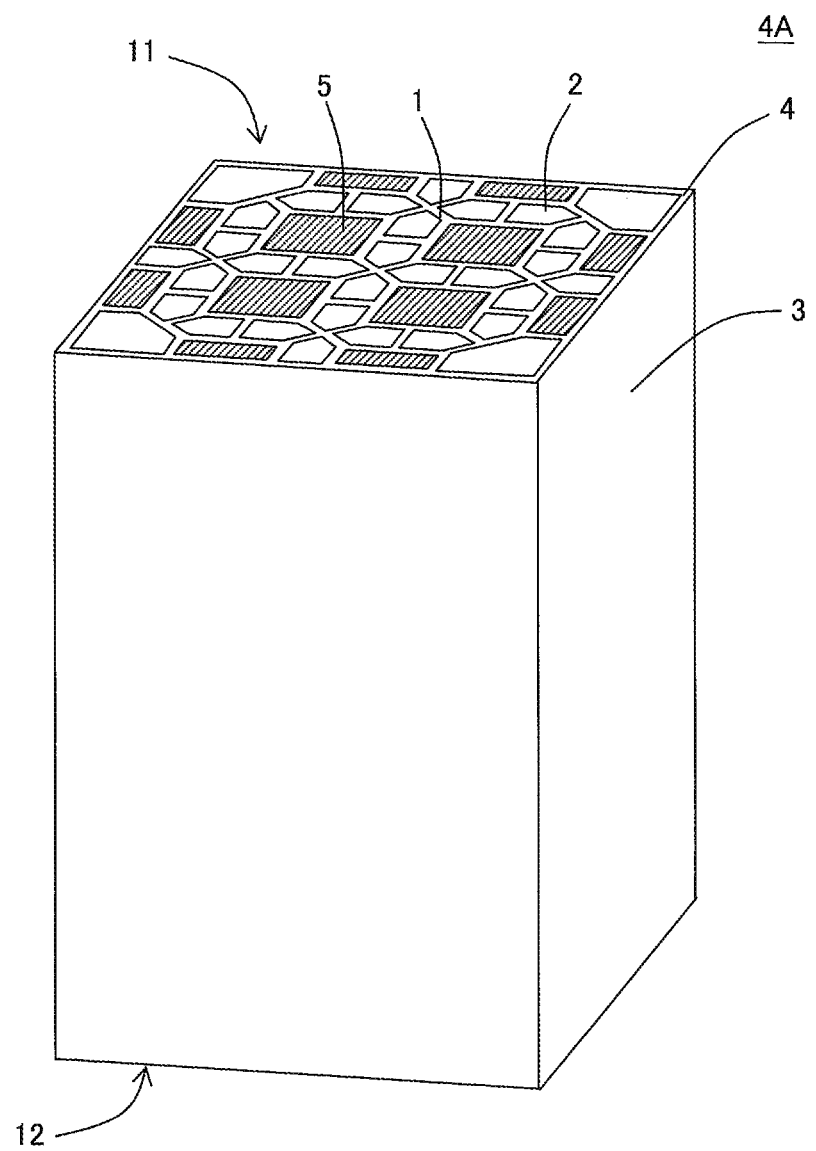
FIG. 6 is a perspective view schematically showing a plugged honeycomb segment for use in the plugged honeycomb structure shown in FIG. 1 and seen from the inflow end face side.
Figure 7:
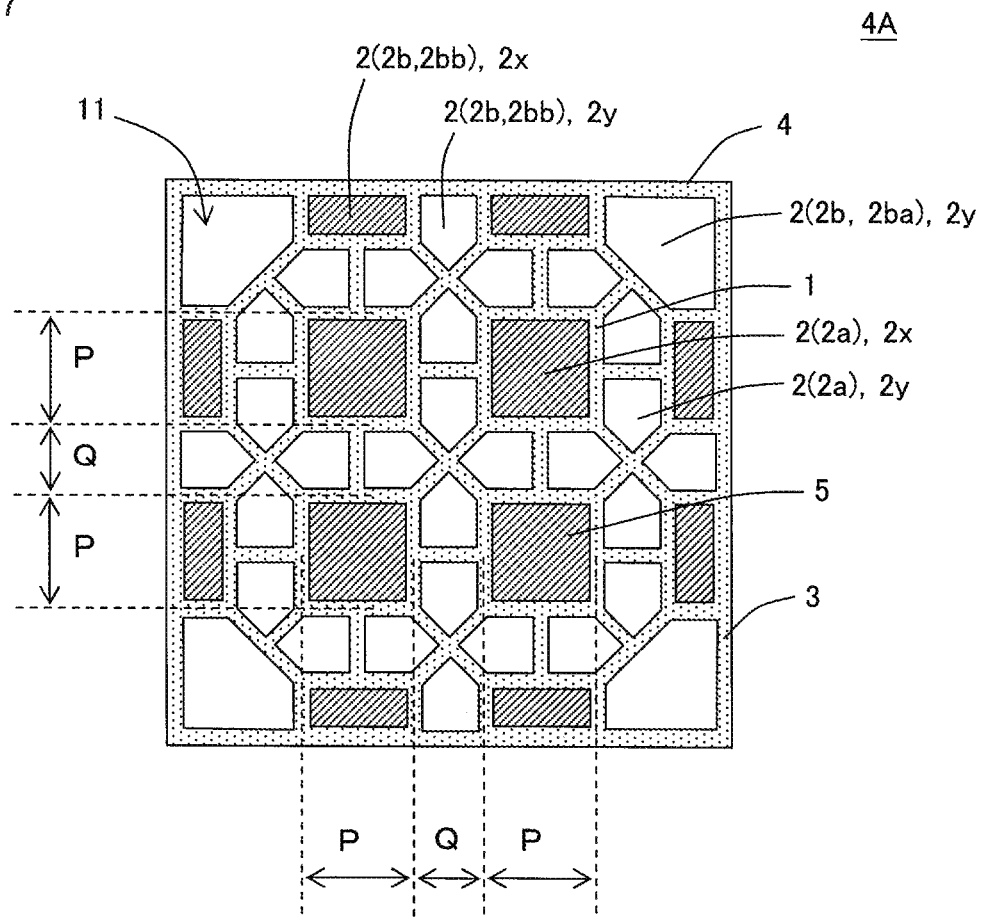
FIG. 7 is a plan view schematically showing the plugged honeycomb segment for use in the plugged honeycomb structure shown in FIG. 1 and seen from the inflow end face side.

Here, FIG. 1 is a perspective view schematically showing the first embodiment of the plugged honeycomb structure of the present invention and seen from an inflow end face side. FIG. 2 is a plan view schematically showing the first embodiment of the plugged honeycomb structure of the present invention and seen from the inflow end face side. FIG. 3 is an enlarged plan view of an enlarged part of an inflow end face of the plugged honeycomb structure shown in FIG. 1. FIG. 4 is an enlarged plan view of an enlarged part of an outflow end face of the plugged honeycomb structure shown in FIG. 1. FIG. 5 is a cross-sectional view schematically showing a cross section taken along the A-A' line of FIG. 3. FIG. 6 is a perspective view schematically showing a plugged honeycomb segment for use in the plugged honeycomb structure shown in FIG. 1 and seen from the inflow end face side. FIG. 7 is a plan view schematically showing the plugged honeycomb segment for use in the plugged honeycomb structure shown in FIG. 1 and seen from the inflow end face side.

As shown in FIG. 6 and FIG. 7, the honeycomb segment 4 has porous partition walls 1 arranged to surround a plurality of cells 2 extending from an inflow end face 11 from which a fluid flows inside to an outflow end face 12 from which the fluid flows outside, and segment circumferential walls 3 arranged at an outermost circumference. As shown in FIG. 1 to FIG. 5, the plugged honeycomb structure 100 includes the plurality of honeycomb segments 4, and side surfaces of the plurality of honeycomb segments 4 are bonded to one another via the bonding layer 6. In the plurality of honeycomb segments 4, the honeycomb segments 4 arranged in a central portion of the plugged honeycomb structure 100 possess "a prismatic columnar shape" in which a direction from the inflow end face 11 toward the outflow end face 12 is an axial direction. On the other hand, in the plurality of honeycomb segments 4, the honeycomb segments 4 arranged in a circumferential portion that comes in contact with the outer wall 8 possess a pillar shape obtained by grinding, along a shape of the outer wall 8, a part of the honeycomb segment 4 formed in a prismatic columnar shape.

The bonding layer 6 is made of a bonding material that bonds side surfaces of a plurality of honeycomb segments 4 to one another. A bonded body obtained by bonding the plurality of honeycomb segments 4 via the bonding layer 6 will be referred to as a honeycomb segment bonded body 7 sometimes.

The plugging portions 5 are arranged in open ends of the cells 2 formed in each honeycomb segment 4 to plug the open ends of the cells 2 on one of an inflow end face 11 side and an outflow end face 12 side. In other words, the plugging portions 5 are arranged in open ends of predetermined cells 2x in the inflow end face 11 of the honeycomb segment 4 and open ends of residual cells 2y other than the predetermined cells 2x in the outflow end face 12. Hereinafter, the cells 2 (i.e., the predetermined cells 2x mentioned above) including the plugging portions 5 arranged in the open ends of the cells 2 in the inflow end face 11 of the honeycomb segment 4 will be referred to as "the outflow cells 2x" sometimes. The cells 2 (i.e., the residual cells 2y mentioned above) including the plugging portions 5 arranged in the open ends of the cells 2 in the outflow end face 12 of the honeycomb segment 4 will be referred to as "the inflow cells 2y" sometimes. The honeycomb segment 4 including the plugging portions 5 arranged in the open ends of the cells 2 will be referred to as a plugged honeycomb segment 4A sometimes.

In a cross section of the honeycomb segment 4 which is perpendicular to an extending direction of the cells 2, at least two types of cells 2 having different shapes are formed to constitute predetermined repeated arrangement patterns. For example, in the honeycomb segment 4 shown in FIG. 6 and FIG. 7, there are formed the cells 2 having two types of different shapes, i.e., the cells 2 (e.g., the outflow cells 2x) having a quadrangular cell shape and the cells 2 (e.g., the inflow cells 2y) having a pentagonal cell shape. Each of the above-mentioned "repeated arrangement patterns" is an arrangement pattern constituted of at least one outflow cell 2x and at least one inflow cell 2y, and two or more arrangement patterns are present in one honeycomb segment 4. Hereinafter, the shape of the cells 2 in the cross section perpendicular to the extending direction of the cells 2 will be referred to as "the cell shape", "a sectional shape" or "a shape of the cross section" sometimes. It is to be noted that the numbers of the outflow cells 2x and the inflow cells 2y formed in each honeycomb segment 4 are not limited to those shown in FIG. 1 to FIG. 7. For example, in FIG. 1 to FIG. 7, the numbers of the outflow cells 2x and the inflow cells 2y which are little smaller than usual numbers are shown for the sake of convenience in describing the above-mentioned "repeated arrangement patterns".

There are not any special restrictions on the arrangement of the plugging portions 5, i.e., the arrangement of the outflow cells 2x and the inflow cells 2y. However, it is preferable that except for a circumferential region of the honeycomb segment 4, the plugging portions 5 are arranged in the open ends of the cells 2 of the honeycomb segment 4 so that the inflow cells 2y surround the outflow cell 2x. For example, as in the honeycomb segment 4 shown in FIG. 6 and FIG. 7, it is preferable that the respective plugging portions 5 are arranged so that the inflow cells 2y having the pentagonal cell shape surround the outflow cell 2x having the quadrangular cell shape. Here, when "the inflow cells 2y surround the outflow cell 2x", it is meant that the cross section perpendicular to the extending direction of the cells 2 has the following constitution. Here, there is described an example where the cell shape of the outflow cells 2x is quadrangular as shown in FIG. 6 and FIG. 7. Initially, the cells are arranged so that one side of the inflow cell 2y is adjacent to each of four sides of one outflow cell 2x. In this case, the cells may be arranged so that one side of each of two or more inflow cells 2y is adjacent to the one side of the one outflow cell 2x. In other words, the cells may be arranged so that one side of one inflow cell 2y is adjacent to a position of a half of one side of the one outflow cell 2x and so that one side of the other inflow cell 2y is adjacent to a position of the other half of the one side of the one outflow cell 2x. Furthermore, all the inflow cells 2y adjacent to the one outflow cell 2x are arranged so that one side of the inflow cell 2y is adjacent to one side of the other inflow cell 2y. The arrangement of the inflow cells 2y in this state means that "the inflow cells 2y surround the outflow cell 2x". It is to be noted that "the circumferential region of the honeycomb segment 4" means a region where after-mentioned "rim circumferential wall cells 2b" are formed.

The cells 2 of each honeycomb segment 4 include the rim circumferential wall cells 2b. The rim circumferential wall cells 2b are the cells 2 having rims surrounded with the partition walls 1 and the segment circumferential walls 3. Furthermore, the cells 2 of the honeycomb segment 4 include whole rim partition wall cells 2a. The whole rim partition wall cells 2a are the cells 2 having whole rims of the cells 2 surrounded with the partition walls 1. Furthermore, the rim circumferential wall cells 2b include corner rim circumferential wall cells 2ba and non-corner rim circumferential wall cells 2bb. The corner rim circumferential wall cells 2ba are the rim circumferential wall cells 2b arranged in corner portions of the honeycomb segment 4. The non-corner rim circumferential wall cells 2bb are the rim circumferential wall cells 2b arranged in portions other than the corner portions of the honeycomb segment 4.

The plugged honeycomb structure 100 of the present embodiment has important characteristics that the corner rim circumferential wall cells 2ba and the non-corner rim circumferential wall cells 2bb satisfy the following condition (a) or (b).

(a) An inflow open area $S1_{in}$ of each corner rim circumferential wall cell 2ba is 1.1 times or more as large as an average inflow open area $S2_{in}$ of the non-corner rim circumferential wall cells 2bb.

(b) An outflow open area $S1_{out}$ of the corner rim circumferential wall cell 2ba is 1.1 times or more as large as an average outflow open area $S2_{out}$ of the non-corner rim circumferential wall cells 2bb.

The plugged honeycomb structure 100 shown in FIG. 1 to FIG. 7 satisfies the above condition (a). The plugged honeycomb structure 100 having this constitution produces the effect that it is possible to inhibit increase of pressure loss due to deposition of incombustible particulate matter while maintaining isostatic strength.

In a conventional plugged honeycomb structure of a segmented structure, it is general that a through channel sectional area (i.e., the open area) of a corner rim circumferential wall cell formed in each corner portion of each honeycomb segment is equal to or relatively smaller than a through channel sectional area of a non-corner rim circumferential wall cell. In other words, usually in a circumferential region of the honeycomb segment, parts of "cell repeated arrangement patterns" in the honeycomb segment often reappear in an incomplete state, and the through channel sectional area of the corner rim circumferential wall cell tends to become relatively small. However, when the through channel sectional area of the corner rim circumferential wall cell decreases, the corner rim circumferential wall cell is likely to close due to the deposition of incombustible particulate matter such as ash. Furthermore, when the corner rim circumferential wall cells are outflow cells as in an after-mentioned third embodiment, a back pressure of the corner rim circumferential wall cells might excessively rise.

When the plugged honeycomb structure satisfies the above condition (a) or (b), the through channel sectional area of the corner rim circumferential wall cell 2ba is larger than the through channel sectional area of the non-corner rim circumferential wall cell 2bb, to inhibit the increase of the pressure loss. Furthermore, the plugged honeycomb structure 100 of the present embodiment does not especially require changes in a structure of the whole honeycomb segment 4, for example, a thickness of the partition walls 1, a cell density and the like, and hence the plugged honeycomb structure does not cause noticeable deterioration of the isostatic strength. Consequently, it is possible to effectively inhibit the increase of the pressure loss of this plugged honeycomb structure while sufficiently acquiring the isostatic strength required to hold the plugged honeycomb structure in, for example, an exhaust gas purifying device.

It is preferable that the inflow open area $S1_{in}$ of the corner rim circumferential wall cell 2ba is 1.2 times or more as large as the average inflow open area $S2_{in}$ of the non-corner rim circumferential wall cells 2bb. Furthermore, it is preferable that the outflow open area $S1_{out}$ of the corner rim circumferential wall cell 2ba is 1.4 times or more as large as the average outflow open area $S2_{out}$ of the non-corner rim circumferential wall cells 2bb. According to this constitution, it is possible to more effectively inhibit the increase of the pressure loss of the plugged honeycomb structure.

In the plugged honeycomb structure 100 of the present embodiment, it is further preferable that the corner rim circumferential wall cells 2ba and the non-corner rim circumferential wall cells 2bb satisfy the following condition (c) or (d).

(c) The inflow open area $S1_{in}$ of the corner rim circumferential wall cell 2ba is smaller than 4.0 times as large as the average inflow open area $S2_{out}$ of the non-corner rim circumferential wall cells 2bb.

(d) The outflow open area $S1_{out}$ of the corner rim circumferential wall cell 2ba is smaller than 4.0 times as large as the average outflow open area $S2_{out}$ of the non-corner rim circumferential wall cells 2bb.

When the plugged honeycomb structure satisfies the above condition (c) or (d), it is possible to effectively inhibit the noticeable deterioration of the isostatic strength. It is especially preferable that the inflow open area $S1_{in}$ of the corner rim circumferential wall cell 2ba is 3.6 times or less as large as the average inflow open area $S2_{in}$ of the non-corner rim circumferential wall cells 2bb. Furthermore, it is especially preferable that the outflow open area $S1_{out}$ of the corner rim circumferential wall cell 2ba is 3.6 times or less as large as the average outflow open area $S2_{out}$ of the non-corner rim circumferential wall cells 2bb.

Furthermore, it is preferable that a cell shape of the corner rim circumferential wall cell 2ba that is the inflow cell 2y is different from a cell shape of the whole rim partition wall cell 2a that is the inflow cell 2y. On the other hand, it is preferable that a cell shape of the corner rim circumferential wall cell 2ba that is the outflow cell 2x is different from the cell shape of the whole rim partition wall cell 2a that is the inflow cell 2y. In other words, when the corner rim circumferential wall cell 2ba is the inflow cell 2y, it is preferable that the cell shape of the corner rim circumferential wall cell 2ba is different from that of the whole rim partition wall cell 2a that is the inflow cell 2y in the whole rim partition wall cells 2a. Furthermore, when the corner rim circumferential wall cell 2ba is the outflow cell 2x, it is preferable that the cell shape of the corner rim circumferential wall cell 2ba is different from that of the whole rim partition wall cell 2a that is the outflow cell 2x in the whole rim partition wall cells 2a. When the plugged honeycomb structure having this constitution satisfies the respective conditions hitherto described, it is possible to suitably inhibit the increase of the pressure loss due to the deposition of the incombustible particulate matter while suitably maintaining the isostatic strength.

There are not any special restrictions on the whole shape of the plugged honeycomb structure 100. For example, the whole shape of the plugged honeycomb structure 100 shown in FIG. 1 is a round pillar shape including the inflow end face 11 and the outflow end face 12 which are round. Additionally, although not shown in the drawing, the whole shape of the plugged honeycomb structure may be a pillar shape including the inflow end face and outflow end face which have a substantially round shape such as an elliptic shape, a racetrack shape or an oblong shape. Alternatively, the whole shape of the plugged honeycomb structure may be a prismatic columnar shape including the inflow end face and outflow end face which have a polygonal shape such as a quadrangular shape or a hexagonal shape.

There are not any special restrictions on a material constituting the honeycomb segment, but from the viewpoints of strength, heat resistance, durability and the like, it is preferable that a main component is any oxide or non-oxide ceramic, a metal or the like. Specifically, it is considered that examples of ceramic include cordierite, mullite, alumina, spinel, silicon carbide, silicon nitride, and aluminum titanate. It is considered that examples of the metal include a Fe—Cr—Al based metal and metal silicon. It is preferable that the main component is one or at least two selected from these materials. From the viewpoints of high strength, high heat resistance and the like, it is especially preferable that the main component is one or at least two selected from the group consisting of alumina, mullite, aluminum titanate, cordierite, silicon carbide and silicon nitride. Furthermore, from the viewpoints of high thermal conductivity, high heat resistance and the like, silicon carbide or a silicon-silicon carbide composite material is especially suitable. Here, "the main component" means a component constituting 50 mass % or more, preferably 70 mass % or more, and further preferably 80 mass % or more of the honeycomb segment.

There are not any special restrictions on a material of the plugging portions. It is preferable that the material of the plugging portions includes one or at least two selected from the group consisting of various ceramics and the metal which are the above-mentioned examples of the suitable material of the honeycomb segment.

In the plugged honeycomb structure of the present embodiment, a plurality of honeycomb segments (more specifically, a plurality of plugged honeycomb segments) are bonded to one another via the bonding layer. According to this constitution, thermal stress applied to the plugged honeycomb structure is dispersible, and it is possible to effectively prevent generation of cracks due to local temperature rise.

There are not any special restrictions on a size of the honeycomb segment. However, when the size of one honeycomb segment is excessively large, the effect of preventing the generation of the cracks might not sufficiently be exerted. On the other hand, when the size of the one honeycomb segment is excessively small, an operation of bonding the honeycomb segments via the bonding layer might become laborious.

There are not any special restrictions on a shape of the honeycomb segment. An example of the shape of the honeycomb segment is a prismatic columnar shape in which a sectional shape perpendicular to the axial direction of the honeycomb segment is a polygonal shape such as a quadrangular shape or a hexagonal shape. It is to be noted that the honeycomb segment disposed at the outermost circumference of the plugged honeycomb structure may be obtained by processing such as grinding of a part of the prismatic columnar shape in accordance with the whole shape of the plugged honeycomb structure.

As shown in FIG. 1 to FIG. 5, in the plugged honeycomb structure 100 of the present embodiment, predetermined repeated arrangement patterns of each honeycomb segment 4 are formed by the whole rim partition wall cells 2a. The whole rim partition wall cells 2a include the inflow cells 2y and the outflow cells 2x, and as to the inflow cell 2y constituting the repeated arrangement patterns, a sectional shape of the inflow cell 2y which is perpendicular to a central axis direction is apparently substantially pentagonal. Furthermore, as to the outflow cell 2x forming the repeated arrangement patterns, a sectional shape of the outflow cell 2x which is perpendicular to the central axis direction is apparently substantially square. The above "sectional shape" is a shape appearing in a cross section of each cell 2 when the cell is cut with a plane perpendicular to the central axis direction, and is a shape of a portion surrounded with the partition walls 1 forming the cell 2. Furthermore, the honeycomb segment 4 of the plugged honeycomb structure 100 of the present embodiment has the repeated arrangement patterns of the cells arranged so that eight inflow cells 2y having a substantially pentagonal sectional shape surround the outflow cell 2x having a substantially square sectional shape. According to this constitution, in the plugged honeycomb structure 100 of the present embodiment, differently from the conventional plugged honeycomb structure, a filtration area of the honeycomb segment 4 can increase in case of use of the structure as a filter. Consequently, it is possible to decrease the pressure loss during PM deposition. Furthermore, in the honeycomb segment 4 having this constitution, the outflow cells 2x are not adjacent to each other, and the whole periphery of the outflow cell 2x is surrounded with the inflow cells 2y. In consequence, it is possible to increase an open frontal area of the outflow cell 2x, and the number of the outflow cells 2x can be smaller than the number of the inflow cells 2y, so that it is possible to decrease the pressure loss in an initial stage of the use of the plugged honeycomb structure 100.

As shown in FIG. 1 to FIG. 5, the inflow cell 2y having a substantially pentagonal sectional shape is not regularly pentagonal, but preferably has a so-called home base shape in which inner angles are, for example, 90°, 135°, 90°, 90°, and 135° clockwise from one apex. According to this constitution, four inflow cells 2y are adjacently formed so that corner portions of the respective home base shapes on point sides gather. In a portion where the corner portions of the respective home base shapes of the four inflow cells 2y on the point sides gather, two partition walls 1 are perpendicular to each other, a heat capacity of the partition walls 1 in the portion where the corner portions gather is highly maintainable, and the thermal stress during the PM burning can be relaxed.

Figure 8:
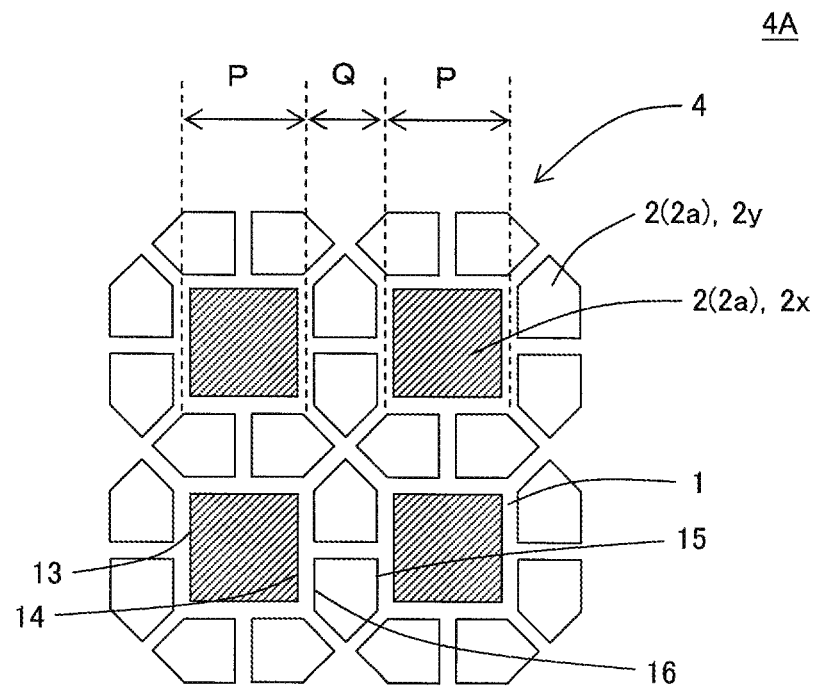
FIG. 8 is a schematic partial enlarged view of the first embodiment of the plugged honeycomb structure of the present invention seen from the inflow end face side.

As shown in FIG. 8, it is preferable that a distance P that is a distance between the partition wall 1 forming a first side 13 of the outflow cell 2x and the partition wall 1 forming a second side 14 facing the first side 13 of the outflow cell 2x is in a range in excess of 0.8 mm and smaller than 3.8 mm. The distance P indicates the shortest distance connecting the center of the partition wall 1 forming the first side 13 in a thickness direction to the center of the partition wall 1 forming the facing second side 14 in the thickness direction. On the other hand, as shown in FIG. 8, a distance between the partition wall 1 forming a third side 15 of the inflow cell 2y which is substantially parallel and adjacent to one side of the outflow cell 2x and the partition wall 1 forming a fourth side 16 facing the third side 15 of the inflow cell 2y is defined as a distance Q. It is preferable that a ratio of the distance Q to the distance P is in a range of 0.2 or more and smaller than 1.6. The distance Q indicates the shortest distance connecting the center of the partition wall 1 forming the third side 15 in the thickness direction to the center of the partition wall 1 forming the facing fourth side 16 in the thickness direction. A relation between the distance P and the distance Q is adjusted in the above range, whereby the initial pressure loss and the pressure loss during the PM deposition preferably decrease with good balance. FIG. 8 is a schematic partial enlarged view of the first embodiment of the plugged honeycomb structure of the present invention seen from the inflow end face side.

A thickness of the segment circumferential wall of the honeycomb segment is preferably from 0.3 to 1.0 mm, further preferably from 0.3 to 0.8 mm, and especially preferably from 0.4 to 0.6 mm. When the thickness of the segment circumferential wall of the honeycomb segment is smaller than 0.3 mm, the strength of the honeycomb segment unfavorably deteriorates. When the thickness of the segment circumferential wall of the honeycomb segment is in excess of 1.0 mm, the pressure loss unfavorably increases, and thermal shock resistance unfavorably deteriorates.

A thickness of the bonding layer is preferably from 0.5 to 1.5 mm, further preferably from 0.7 to 1.3 mm, and especially preferably from 0.8 to 1.2 mm. When the thickness of the bonding layer is smaller than 0.5 mm, the thermal shock resistance unfavorably deteriorates. When the thickness of the bonding layer is in excess of 1.5 mm, the pressure loss unfavorably increases.

Furthermore, in the plugged honeycomb structure of the present embodiment, it is preferable that the whole rim partition wall cells include two or more types of cells having different sectional shapes. In the plugged honeycomb structure 100 shown in FIG. 1 to FIG. 5, the outflow cells 2x having a substantially square sectional shape are the whole rim partition wall cells 2a having a first sectional shape, and the inflow cells 2y having a substantially pentagonal sectional shape are the whole rim partition wall cells 2a having a second sectional shape. According to this constitution, at least two types of cells having different sectional shapes suitably form predetermined repeated arrangement patterns. It is to be noted that when the cell sectional shape is polygonal, each corner portion of the polygonal shape may possess a curved shape having a radius. For example, the substantially square shape generically refers to a square sectional shape and a curved square sectional shape in which at least one corner portion of the square shape is formed in the curved shape having the radius. Similarly, the substantially pentagonal shape generically refers to a pentagonal sectional shape and a curved pentagonal sectional shape in which at least one corner portion of the pentagonal shape is formed into the curved shape having the radius.

There are not any special restrictions on the thickness of the partition walls 1. For example, the thickness of the partition wall 1 present between one side of one cell 2 and one side of the other cell 2 substantially parallel and adjacent to the one cell 2 is preferably from 0.07 to 0.51 mm, further preferably from 0.10 to 0.46 mm, and especially preferably from 0.12 to 0.38 mm. When the thickness of the partition walls 1 is smaller than 0.07 mm, formation of the honeycomb segment 4 unfavorably becomes difficult. On the other hand, when the thickness of the partition walls 1 is larger than 0.51 mm, the thickness is unfavorable from the viewpoints of acquisition of the filtration area and decrease of the pressure loss.

Furthermore, one of suitable examples of the plugged honeycomb structure of the present embodiment includes each honeycomb segment constituted as follows. In the inflow cells 2$y$, a geometric surface area (GSA) is preferably from 10 to 30 $cm^2/cm^3$ and further preferably from 12 to 18 $cm^2/cm^3$. Here, the above-mentioned "geometric surface area (GSA)" is a value (S/V) obtained by dividing a total inner surface area (S) of the inflow cells 2$y$ by a total volume (V) of the honeycomb segment. In general, a thickness of PM deposited in the partition walls can decrease as the filtration area of the filter increases, and hence it is possible to minimize the pressure loss of the plugged honeycomb structure by adjustment of the geometric surface area (GSA) in the above-mentioned numeric range. Therefore, when the geometric surface area (GSA) of the inflow cells 2$y$ is smaller than 10 $cm^2/cm^3$, the pressure loss during the PM deposition unfavorably increases. On the other hand, when the GSA is larger than 30 $cm^2/cm^3$, the initial pressure loss unfavorably increases.

In the plugged honeycomb structure of the present embodiment, a cell sectional open frontal area of the inflow cell 2$y$ has a ratio of preferably from 20 to 70% and further preferably from 25 to 65%. When the ratio of the cell sectional open frontal area of the inflow cell 2$y$ is smaller than 20%, the initial pressure loss unfavorably increases. Furthermore, when the ratio is larger than 70%, a filtration flow velocity increases to deteriorate a PM trapping efficiency, and further the strength of the partition walls 1 unfavorably runs short. Here, "the ratio of the cell sectional open frontal area of the inflow cell 2$y$" means a ratio of "a sum of sectional areas of the inflow cells 2$y$" to a total of "a sectional area of all the partition walls 1 formed in the plugged honeycomb structure" and "a sum of sectional areas of all the cells 2" in a cross section of the plugged honeycomb structure which is vertical to the central axis direction.

In the plugged honeycomb structure of the present embodiment, a hydraulic diameter of each of the whole rim partition wall cells 2$a$ is preferably from 0.5 to 3.5 mm and further preferably from 0.8 to 2.5 mm. When the hydraulic diameter of each of the whole rim partition wall cells 2$a$ is smaller than 0.5 mm, the initial pressure loss unfavorably increases. On the other hand, when the hydraulic diameter of each of the whole rim partition wall cells 2$a$ is larger than 3.5 mm, a contact area of the exhaust gas with the partition walls 1 decreases, and a purification efficiency unfavorably deteriorates. Here, the hydraulic diameter of each of the whole rim partition wall cells 2$a$ is a value calculated in accordance with 4×(sectional area)/(circumferential length) based on the sectional area and circumferential length of each whole rim partition wall cell 2$a$. The sectional area of the whole rim partition wall cell 2$a$ indicates an area of the shape (the sectional shape) of the cell appearing in the cross section of the plugged honeycomb structure which is vertical to the central axis direction, and the circumferential length of the cell indicates a length of a circumference of the sectional shape of the cell (a length of a closed line surrounding the cross section).

In view of trade-off among the initial pressure loss, the pressure loss during the PM deposition, and the trapping efficiency, it is preferable that a more preferable configuration of the plugged honeycomb structure is as follows. It is preferable to simultaneously satisfy the conditions that the geometric surface area (GSA) of the inflow cells 2$y$ is from 10 to 30 $cm^2/cm^3$ and that the ratio of the cell sectional open frontal area of each inflow cell 2$y$ is from 20 to 70% and that the hydraulic diameter of each of the plurality of cells 2 is from 0.5 to 3.5 min. Furthermore, it is further preferable to simultaneously satisfy the conditions that the geometric surface area (GSA) of the inflow cells 2$y$ is from 12 to 18 $cm^2/cm^3$ and that the ratio of the cell sectional open frontal area of each inflow cell 2$y$ is from 25 to 65% and that the hydraulic diameter of each of the plurality of cells 2 is from 0.8 to 2.5 mm.

In the plugged honeycomb structure of the present embodiment, a catalyst may be loaded onto the partition walls 1 forming the plurality of cells 2. The loading of the catalyst onto the partition walls 1 means coating of the surfaces of the partition walls 1 and inner walls of pores formed in the partition walls 1 with the catalyst. Examples of a type of catalyst include an SCR catalyst (zeolite, titania and vanadium), and a three-way catalyst containing at least two noble metals selected from the group consisting of Pt, Rh and Pd and at least one selected from the group consisting of alumina, ceria and zirconia. Thus, the catalyst is loaded, whereby it is possible to detoxify $NO_x$, CO, HC and the like included in the exhaust gas emitted from a direct injection type gasoline engine, the diesel engine or the like, and it is also possible to easily burn and remove the PM deposited on the surfaces of the partition walls 1 by a catalytic function.

In the plugged honeycomb structure of the present embodiment, there are not any special restrictions on a method of loading such a catalyst as described above, and a method usually performed by the person skilled in the art is employable. Specifically, an example of the method is a method of wash-coating the structure with a catalyst slurry and then performing drying and firing.

Figure 10:
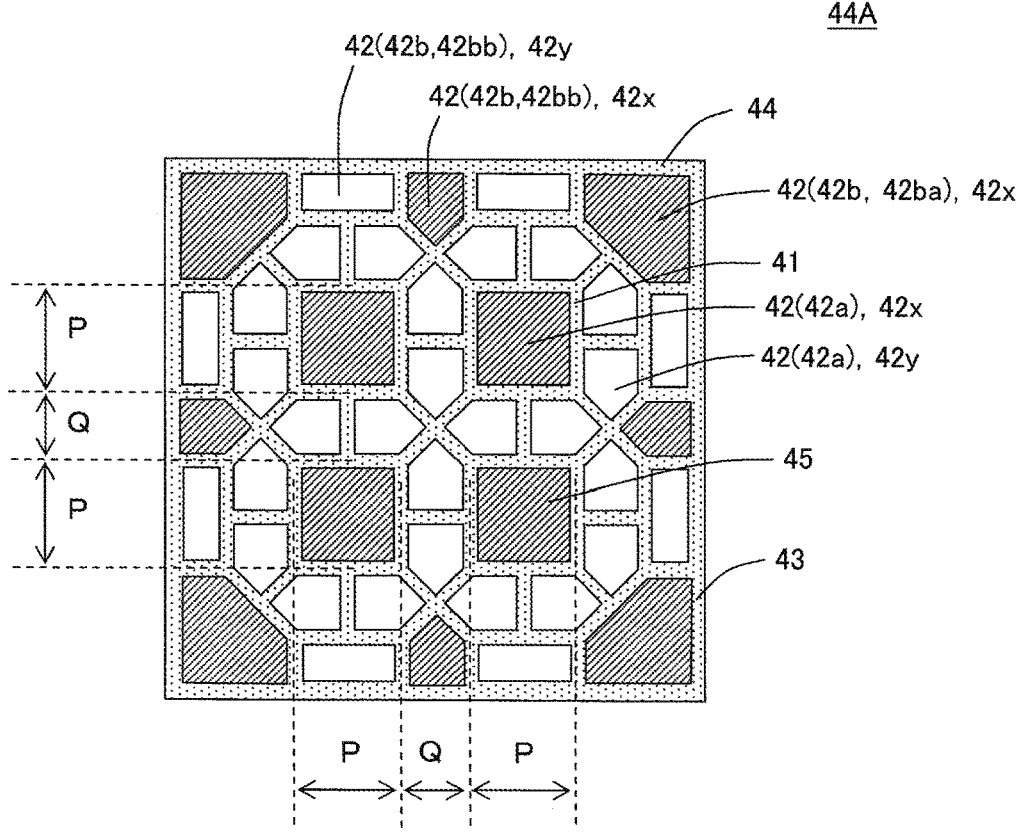
FIG. 10 is a plan view schematically showing a plugged honeycomb segment for use in a third embodiment of the plugged honeycomb structure of the present invention and seen from an inflow end face side.
Figure 11:
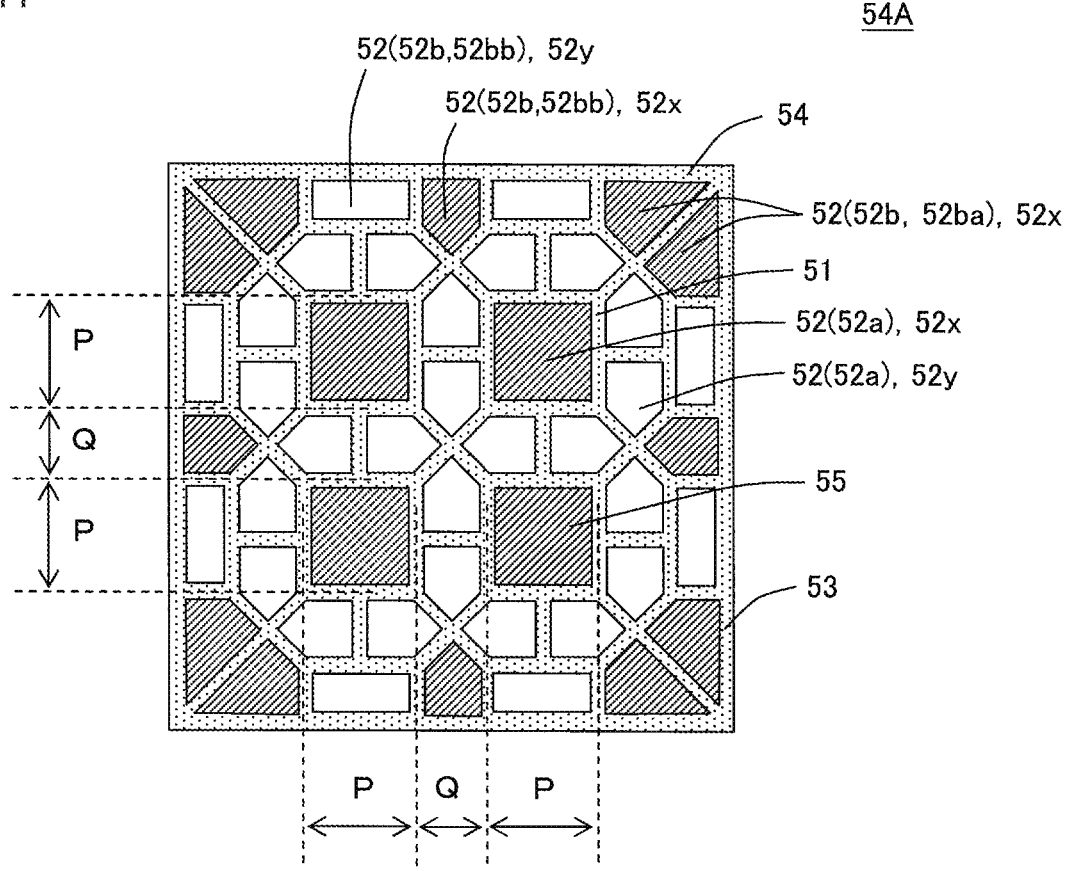
FIG. 11 is a plan view schematically showing a plugged honeycomb segment for use in a fourth embodiment of the plugged honeycomb structure of the present invention and seen from an inflow end face side.
Figure 12:
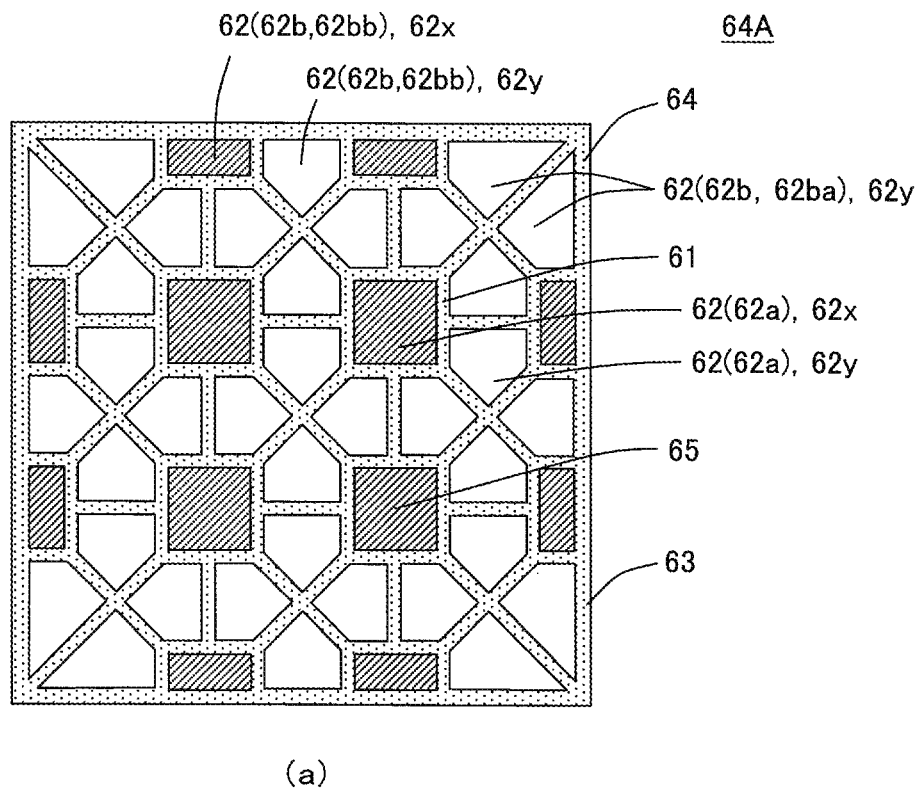
FIG. 12 is a plan view schematically showing a plugged honeycomb segment for use in another embodiment of the plugged honeycomb structure of the present invention and seen from an inflow end face side.
Figure 12:
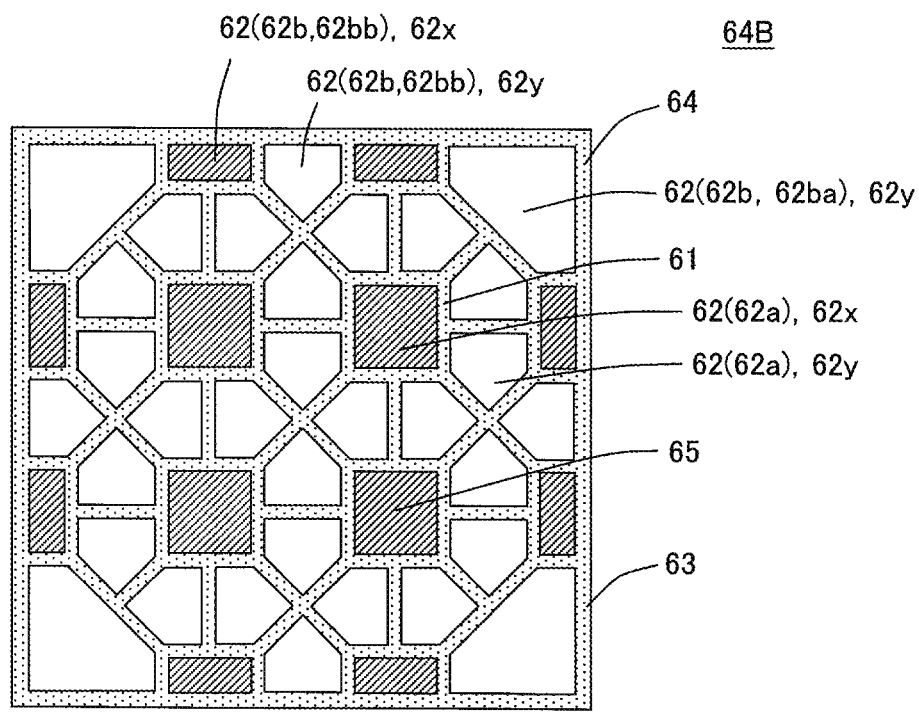
Figure 13:
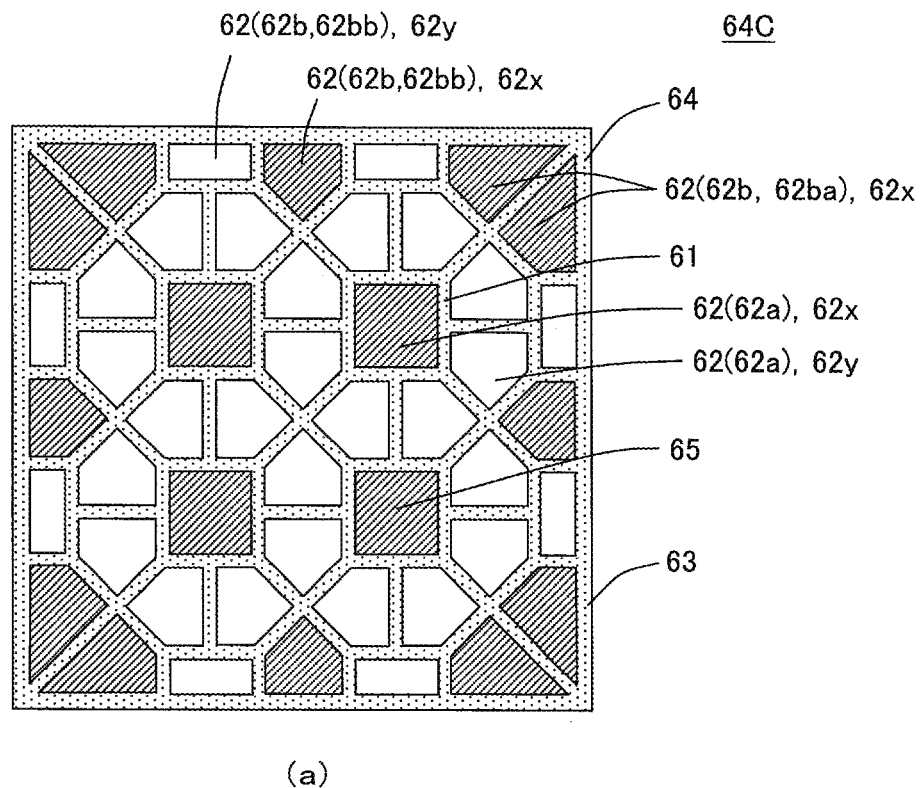
FIG. 13 is a plan view schematically showing a plugged honeycomb segment for use in still another embodiment of the plugged honeycomb structure of the present invention and seen from an inflow end face side.
Figure 13:
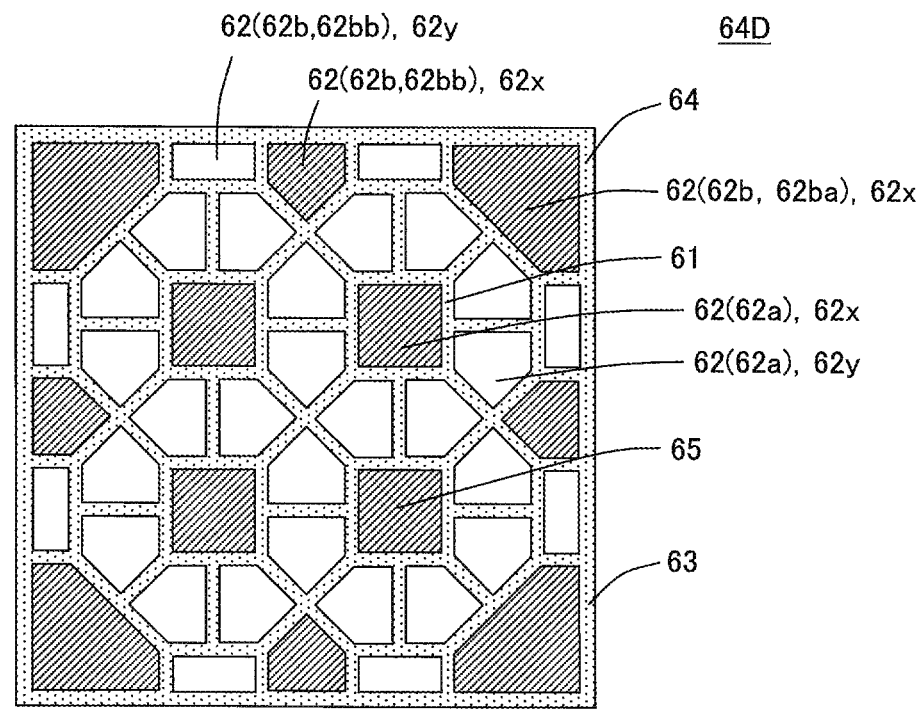
Figure 14:
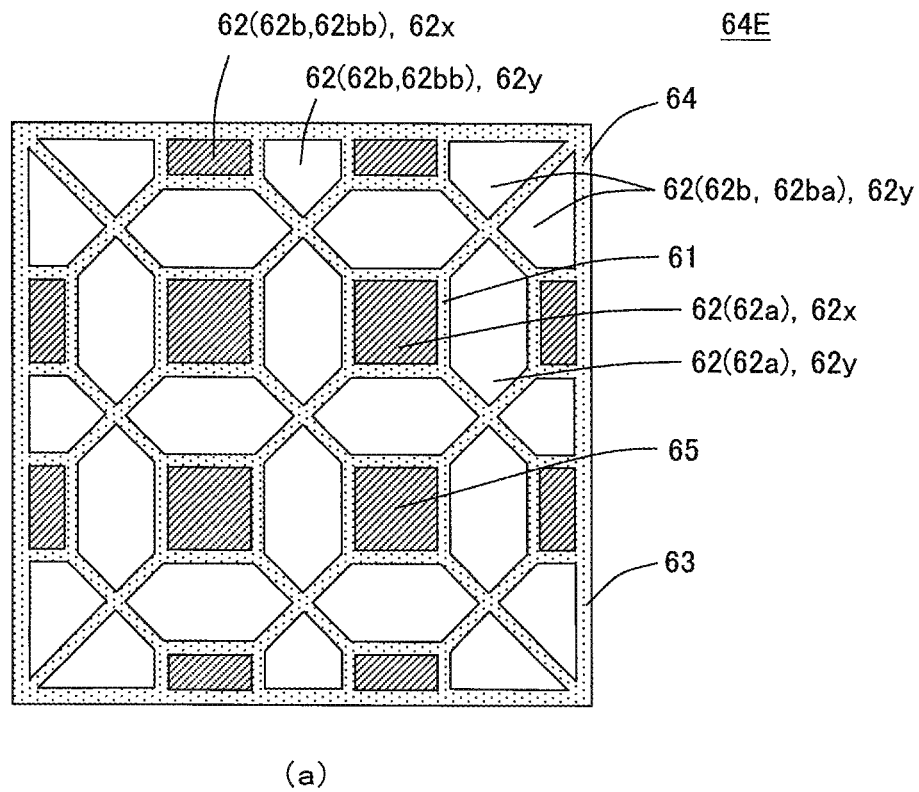
FIG. 14 is a plan view schematically showing a plugged honeycomb segment for use in a further embodiment of the plugged honeycomb structure of the present invention and seen from an inflow end face side.
Figure 14:
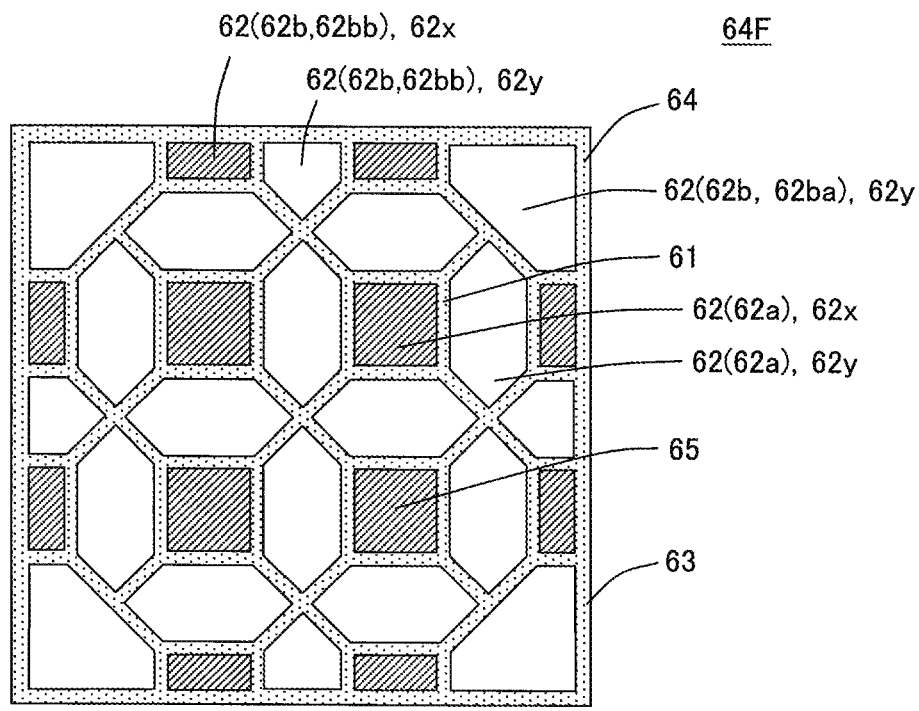
Figure 15:
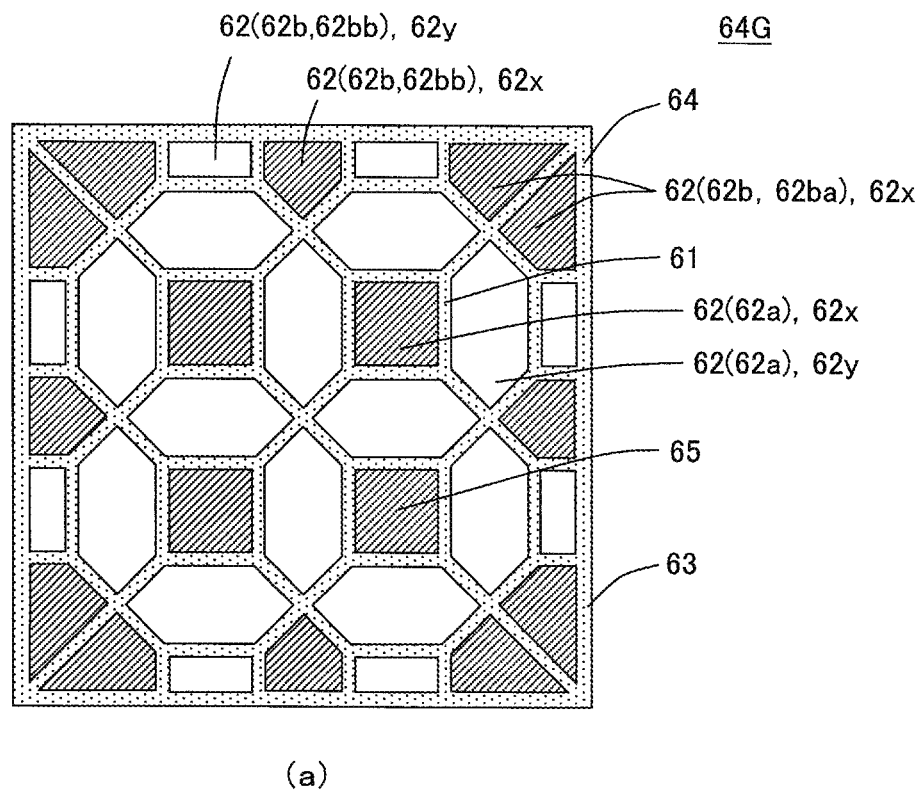
FIG. 15 is a plan view schematically showing a plugged honeycomb segment for use in a further embodiment of the plugged honeycomb structure of the present invention and seen from an inflow end face side.
Figure 15:
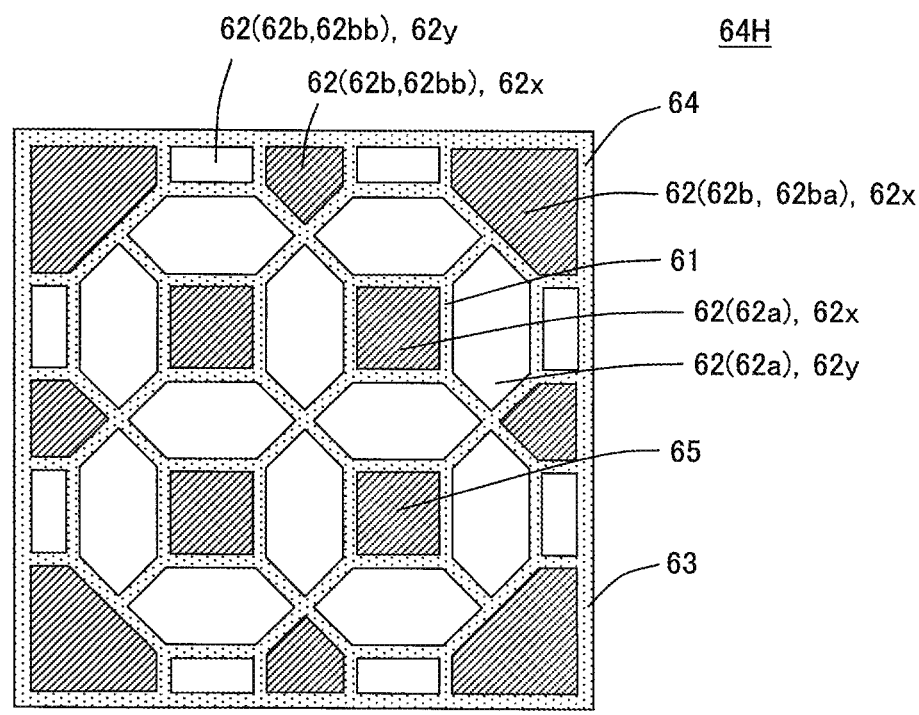
Figure 16:
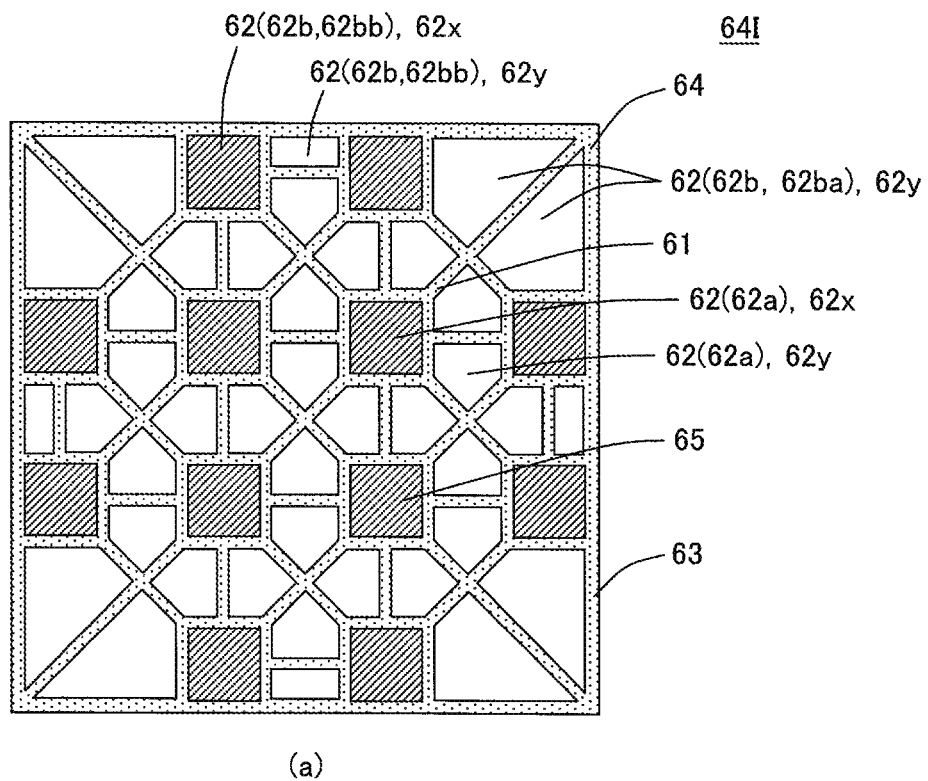
FIG. 16 is a plan view schematically showing a plugged honeycomb segment for use in a further embodiment of the plugged honeycomb structure of the present invention and seen from an inflow end face side.
Figure 16:
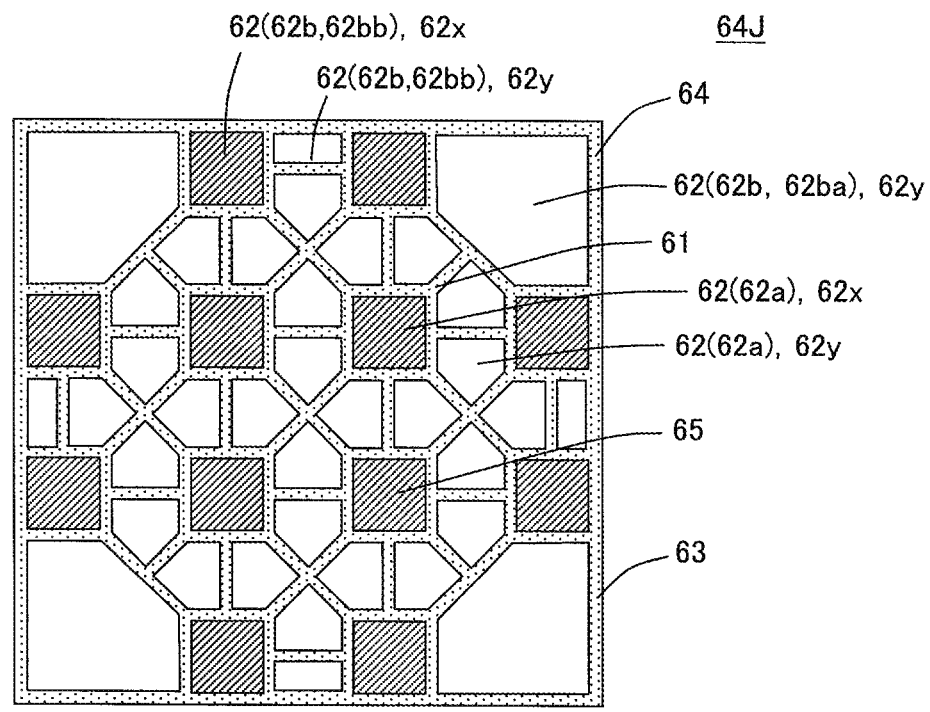
Figure 17:
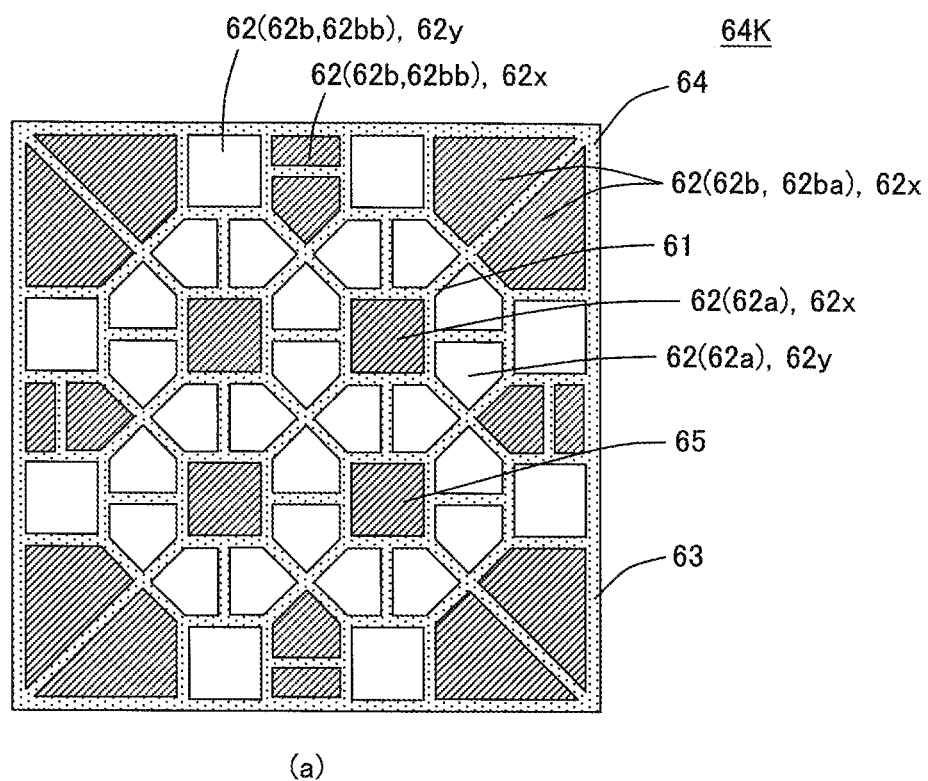
FIG. 17 is a plan view schematically showing a plugged honeycomb segment for use in a further embodiment of the plugged honeycomb structure of the present invention and seen from an inflow end face side.
Figure 17:
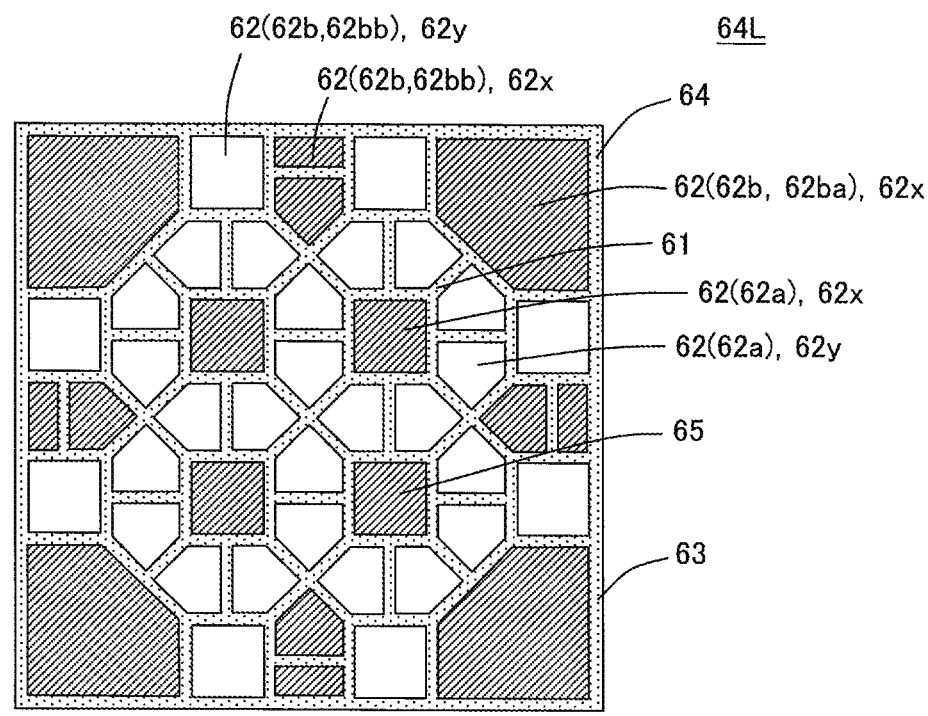
Figure 18:
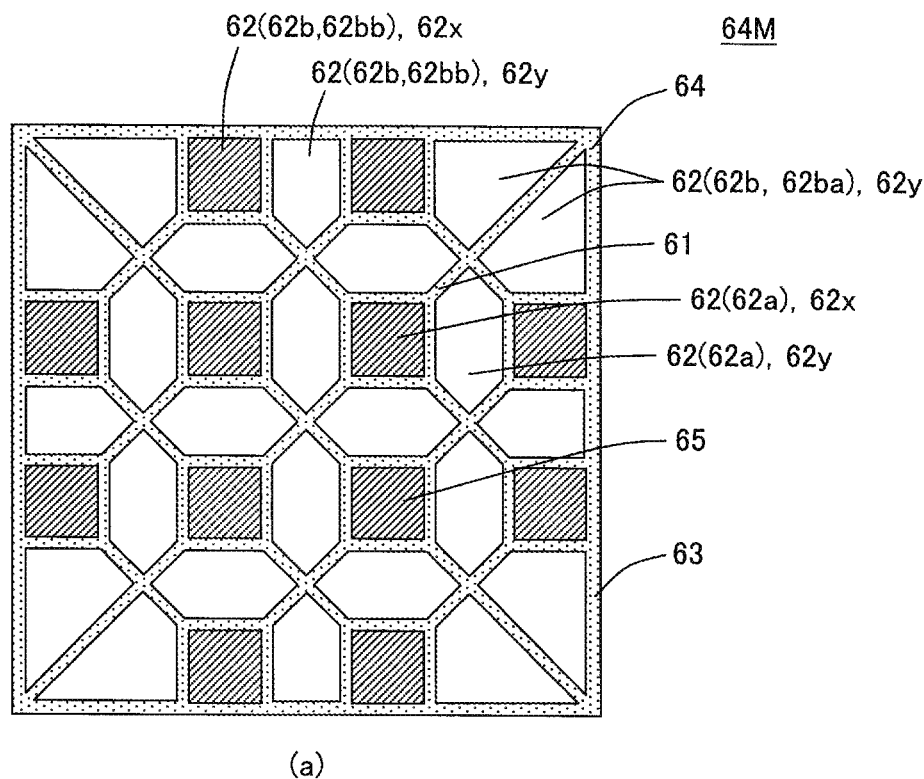
FIG. 18 is a plan view schematically showing a plugged honeycomb segment for use in a further embodiment of the plugged honeycomb structure of the present invention and seen from an inflow end face side.
Figure 18:
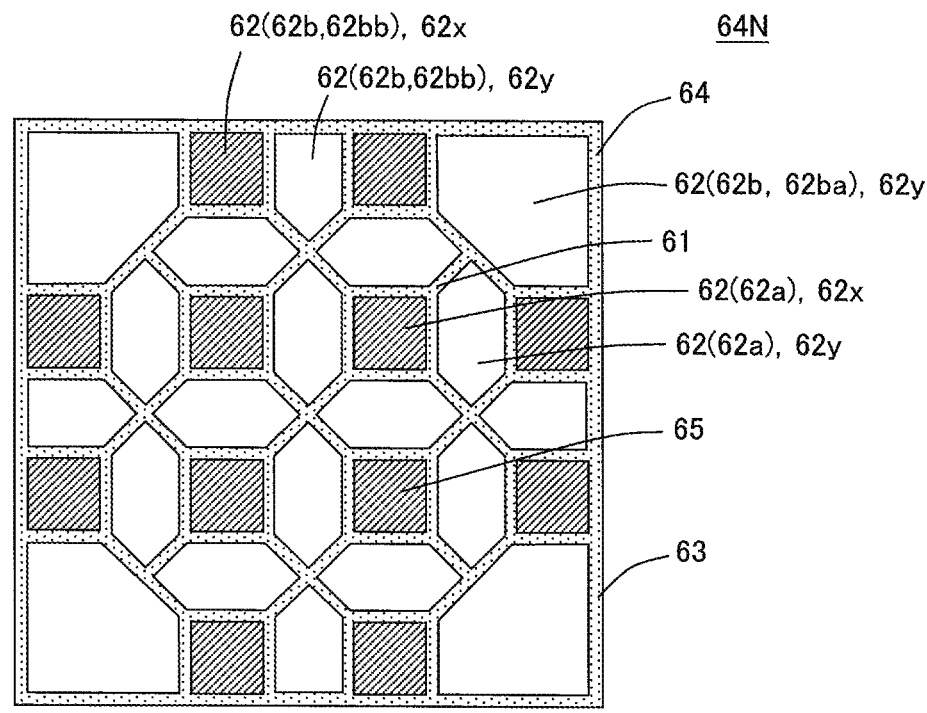
Figure 19:
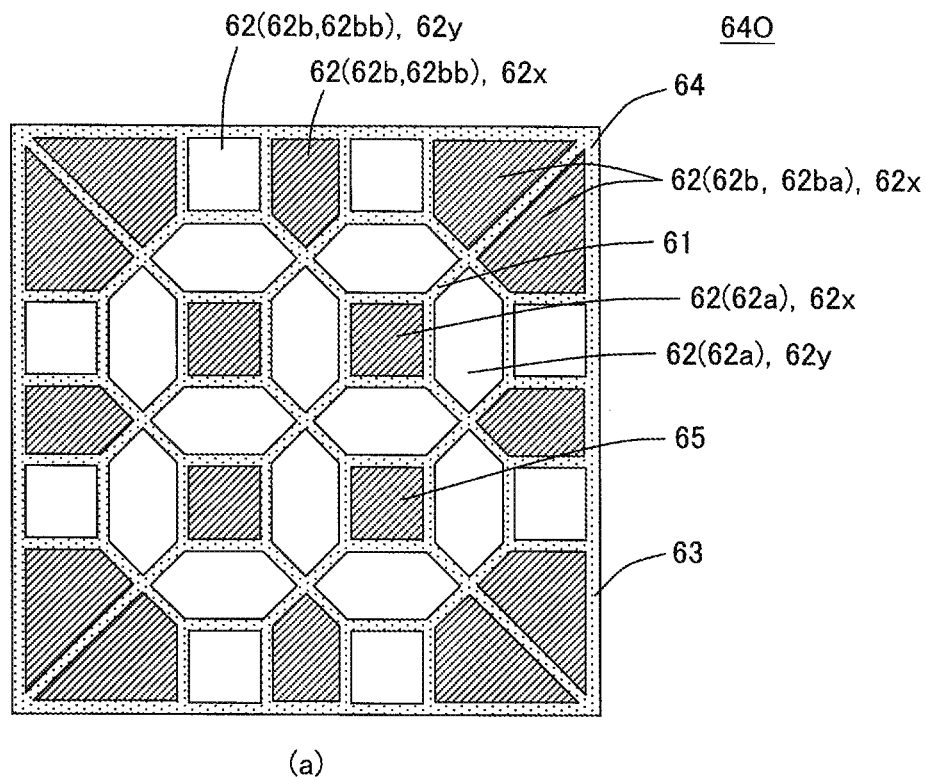
FIG. 19 is a plan view schematically showing a plugged honeycomb segment for use in a further embodiment of the plugged honeycomb structure of the present invention and seen from an inflow end face side.
Figure 19:
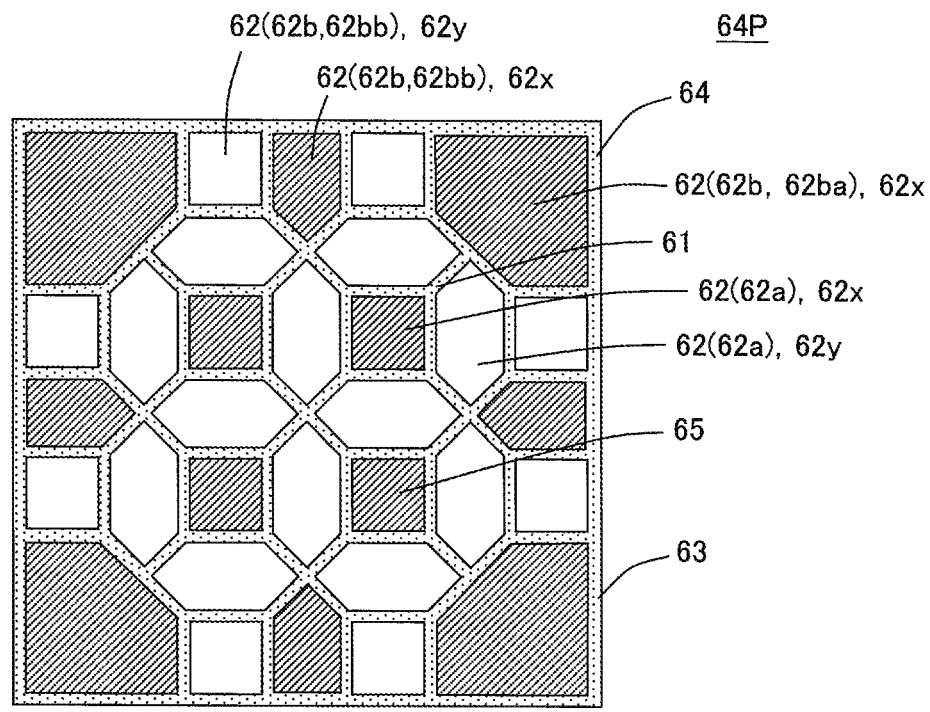
Figure 20:
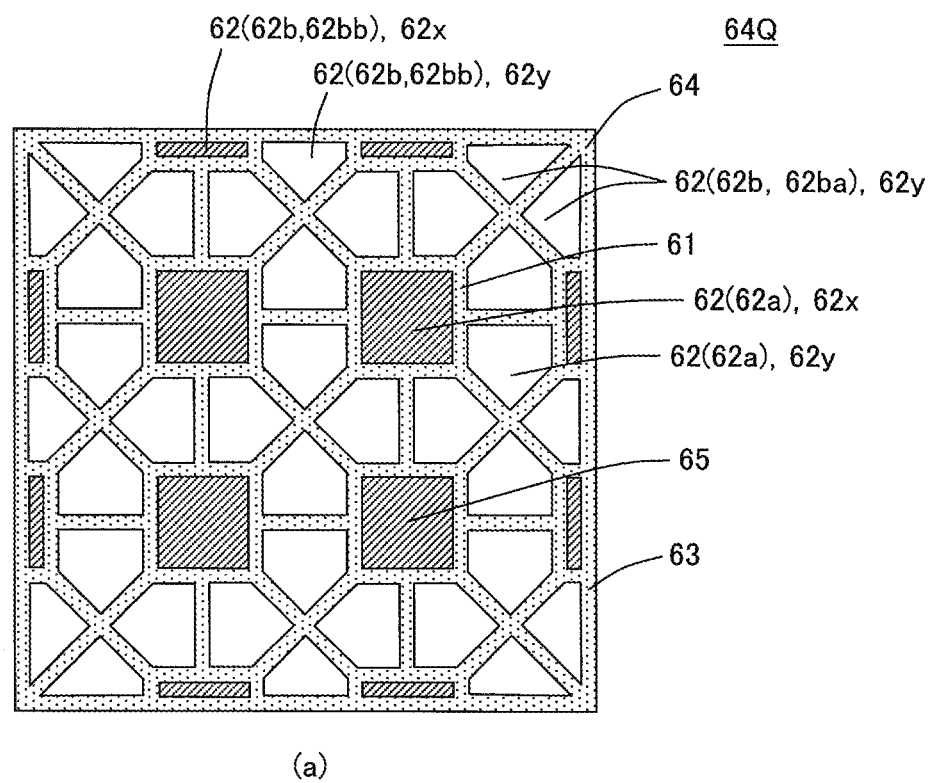
FIG. 20 is a plan view schematically showing a plugged honeycomb segment for use in a further embodiment of the plugged honeycomb structure of the present invention and seen from an inflow end face side.
Figure 20:
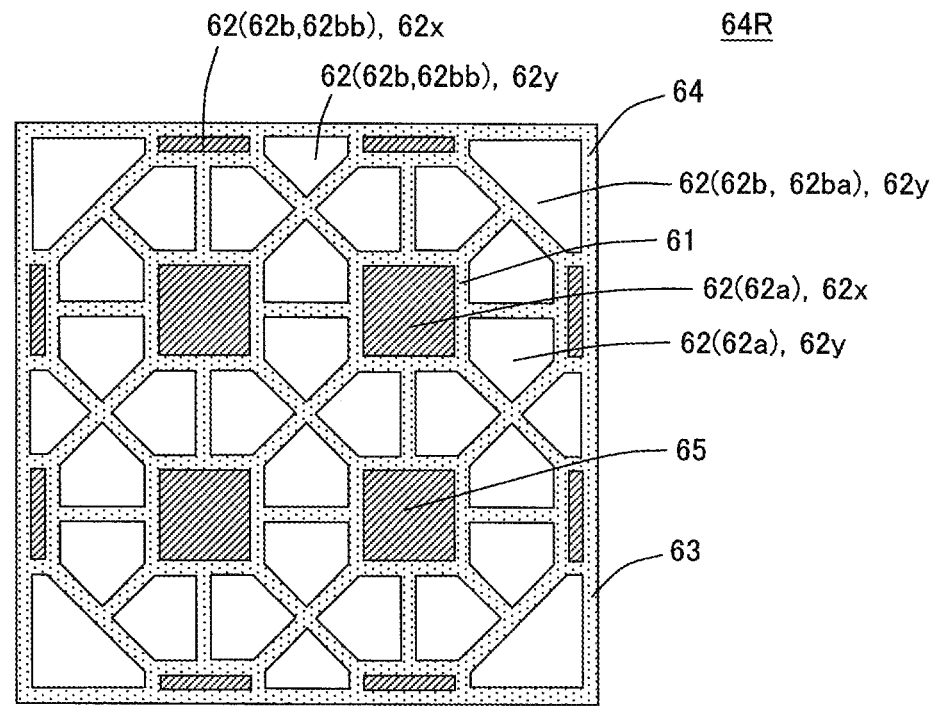
Figure 21:
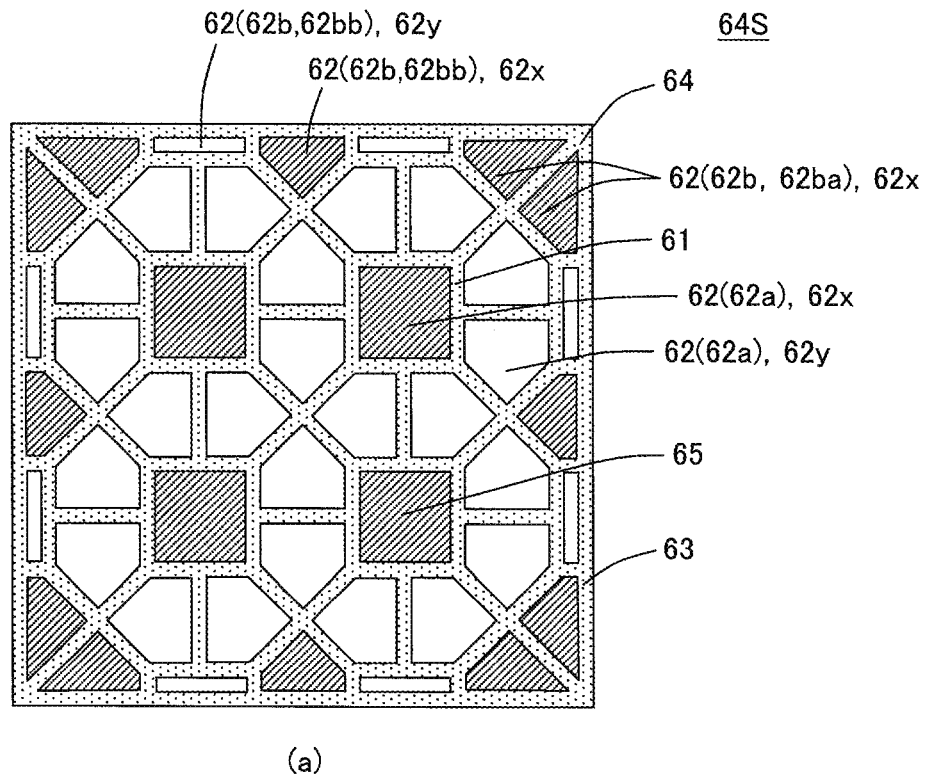
FIG. 21 is a plan view schematically showing a plugged honeycomb segment for use in a further embodiment of the plugged honeycomb structure of the present invention and seen from an inflow end face side.
Figure 21:
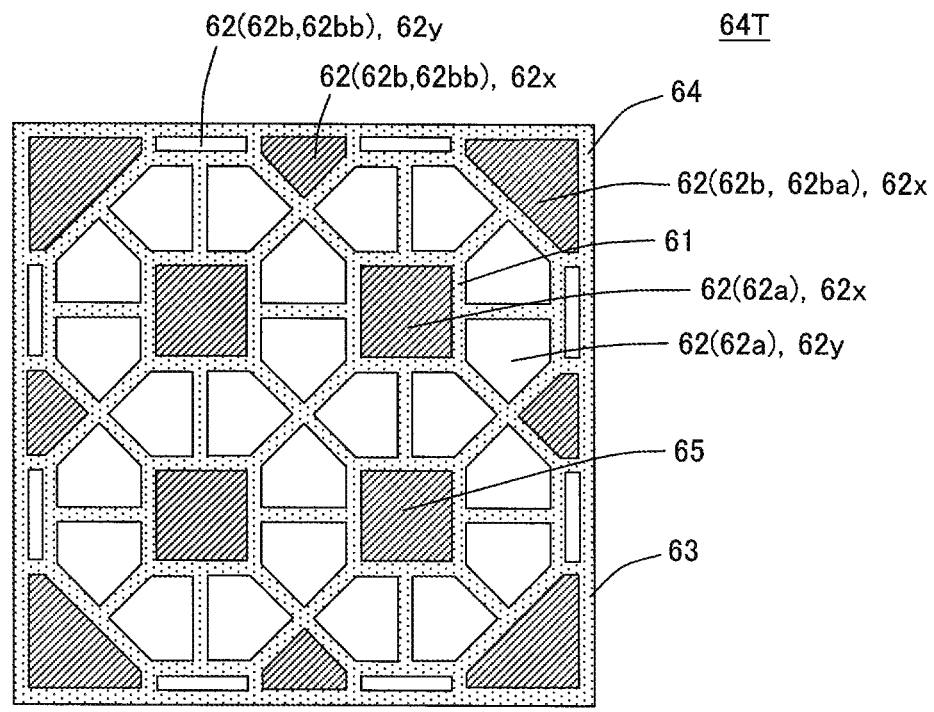
Figure 22:
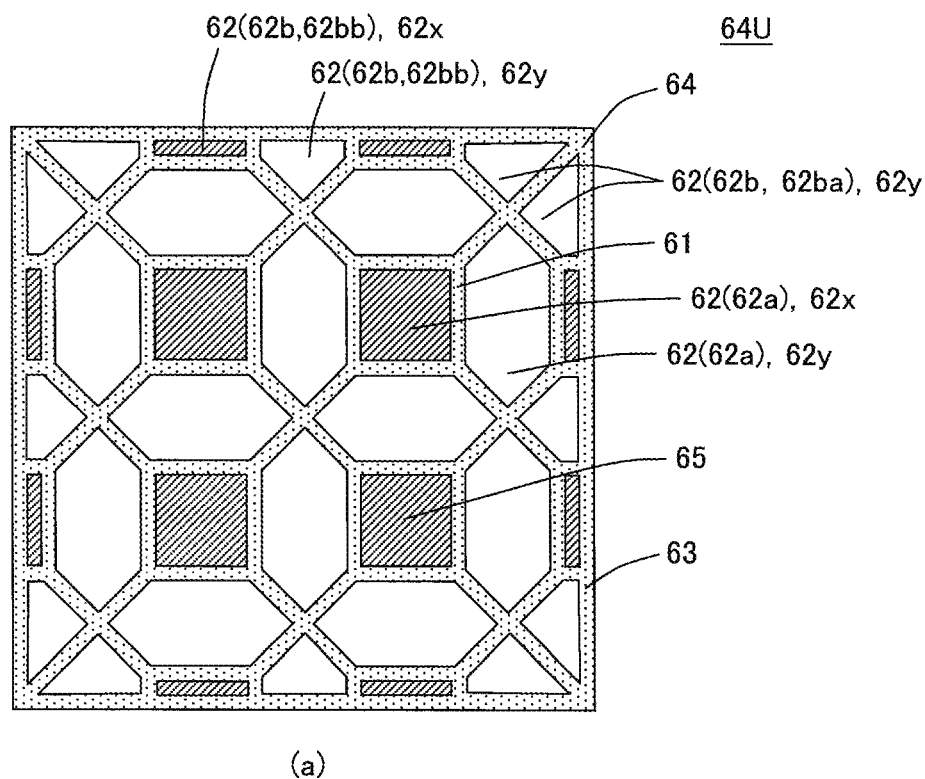
FIG. 22 is a plan view schematically showing a plugged honeycomb segment for use in a further embodiment of the plugged honeycomb structure of the present invention and seen from an inflow end face side.
Figure 22:
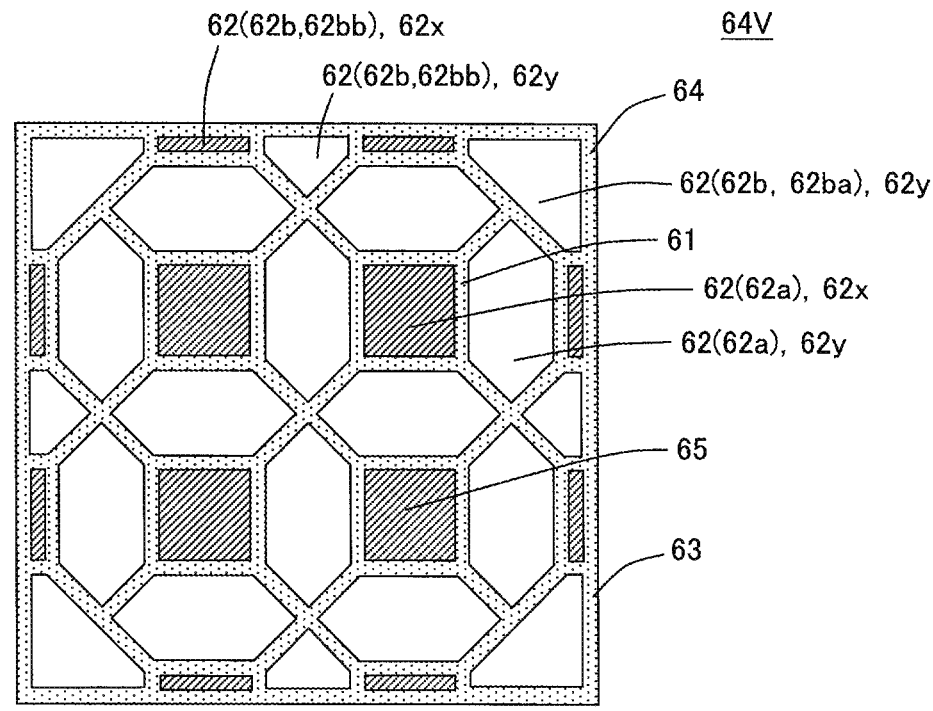
Figure 23:
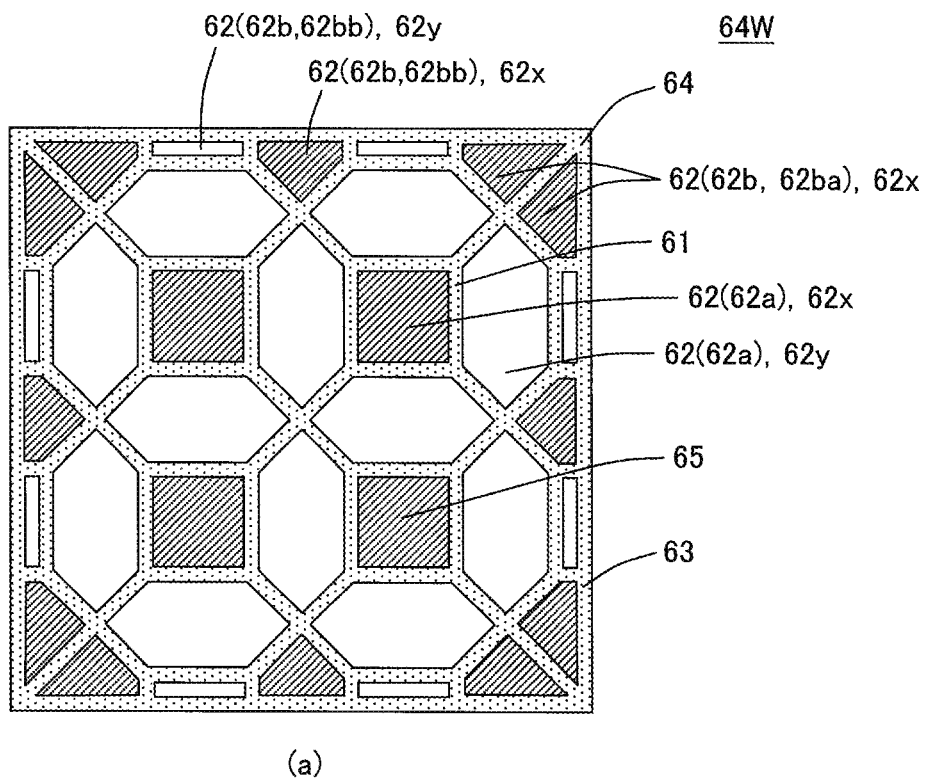
FIG. 23 is a plan view schematically showing a plugged honeycomb segment for use in a further embodiment of the plugged honeycomb structure of the present invention and seen from an inflow end face side.
Figure 23:
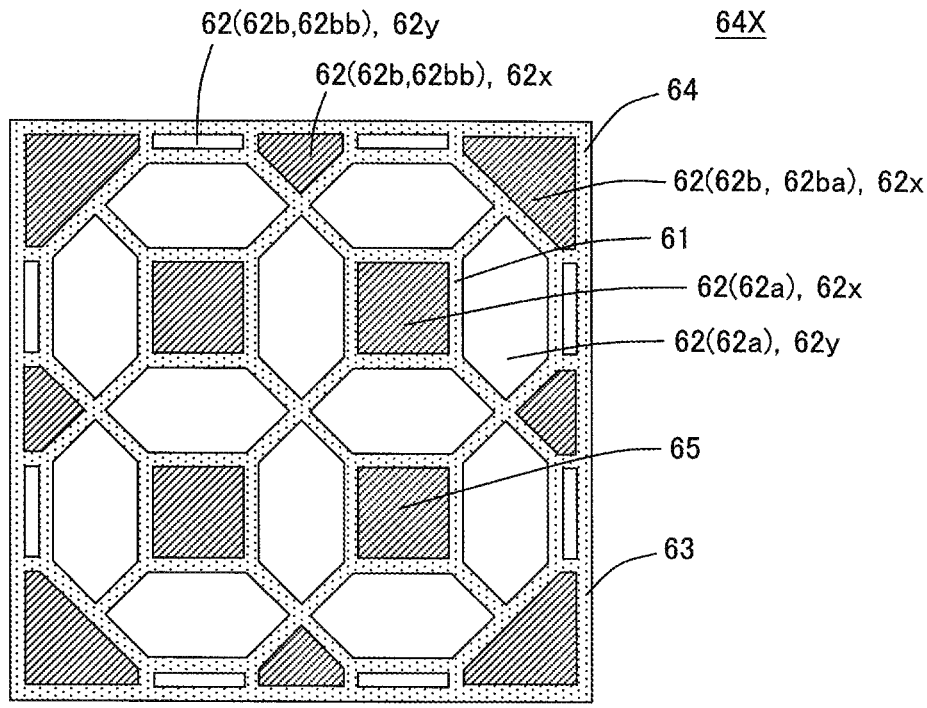

Hereinafter, the other embodiments (a second embodiment to a fourth embodiment) of the plugged honeycomb structure of the present invention will be described. It is preferable that plugged honeycomb structures of the second embodiment to the fourth embodiment have a constitution similar to that of the first embodiment except that constitutions of plugged honeycomb segments are different from the constitution of the plugged honeycomb segment for use in the plugged honeycomb structure of the first embodiment. Here, FIG. 9 to FIG. 11 are plan views schematically showing the plugged honeycomb segments for use in the second embodiment to the fourth embodiment of the plugged honeycomb structure of the present invention, and seen from an inflow end face side.

Figure 9:
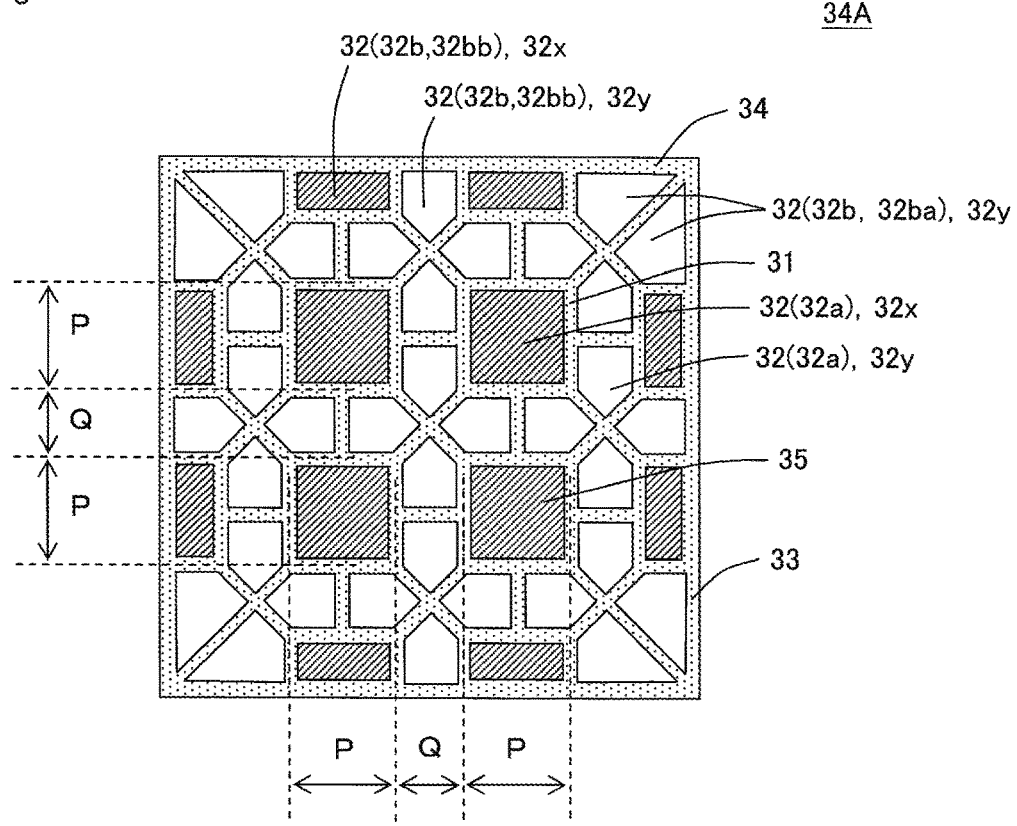
FIG. 9 is a plan view schematically showing a plugged honeycomb segment for use in a second embodiment of the plugged honeycomb structure of the present invention and seen from an inflow end face side.

The plugged honeycomb structure of the second embodiment is constituted by using a plugged honeycomb segment 34A shown in FIG. 9. A honeycomb segment 34 has porous partition walls 31 arranged to surround a plurality of cells 32, and segment circumferential walls 33 arranged at an outermost circumference. Plugging portions 35 are arranged in open ends of outflow cells 32$x$ and open ends of inflow cells 32$y$ in the honeycomb segment 34. Furthermore, except for a circumferential region of the honeycomb segment 34, the plugging portions 35 are arranged in open ends of the cells 32 so that the inflow cells 32y surround the outflow cell 32x.

The plugged honeycomb segment 34A shown in FIG. 9 has "repeated arrangement patterns" each including the outflow cell 32x having a quadrangular sectional shape and the inflow cells 32y having a pentagonal sectional shape.

The outflow cells 32x include whole rim partition wall cells 32a having a square sectional shape, and rim circumferential wall cells 32b each including a shape of a part of the whole rim partition wall cell 32a and having a rectangular sectional shape. Furthermore, the rim circumferential wall cell 32b of the outflow cell 32x constitutes a non-corner rim circumferential wall cell 32bb.

The inflow cells 32y include the whole rim partition wall cells 32a having a pentagonal sectional shape and the rim circumferential wall cells 32b. Furthermore, the rim circumferential wall cell 32b of the inflow cell 32y constitutes a corner rim circumferential wall cell 32ba disposed in each corner portion of the honeycomb segment 34. In the plugged honeycomb segment 34A shown in FIG. 9, two corner rim circumferential wall cells 32ba are arranged in one corner portion of the honeycomb segment 34. More specifically, the corner rim circumferential wall cells 32ba shown in FIG. 9 have a shape obtained by dividing the corner rim circumferential wall cell 2ba in the first embodiment shown in FIG. 7 into two equal cells by the partition wall 31 extending in a diagonal direction of the honeycomb segment 34.

Also in the plugged honeycomb structure of the second embodiment, an inflow open area $S1_{in}$ of each corner rim circumferential wall cell 32ba is 1.1 times or more as large as an average inflow open area $S2_{in}$ of the non-corner rim circumferential wall cells 32bb.

The plugged honeycomb structure of the third embodiment is constituted by using a plugged honeycomb segment 44A shown in FIG. 10. A honeycomb segment 44 has porous partition walls 41 arranged to surround a plurality of cells 42, and segment circumferential walls 43 arranged at an outermost circumference. Plugging portions 45 are arranged in open ends of outflow cells 42x and open ends of inflow cells 42y in the honeycomb segment 44. Furthermore, except for a circumferential region of the honeycomb segment 44, the plugging portions 45 are arranged in open ends of the cells 42 so that the inflow cells 42y surround the outflow cell 42x.

The plugged honeycomb segment 44A shown in FIG. 10 has "repeated arrangement patterns" each including the outflow cell 42x having a quadrangular sectional shape and the inflow cells 42y having a pentagonal sectional shape. The honeycomb segment 44 in the plugged honeycomb segment 44A shown in FIG. 10 is constituted similarly to the honeycomb segment 4 in the plugged honeycomb segment 4A of the first embodiment shown in FIG. 7. However, the plugged honeycomb segment 44A shown in FIG. 10 is different from the plugged honeycomb segment 4A of the first embodiment shown in FIG. 7 in arrangement of the plugging portions 45. More specifically, in the plugged honeycomb segment 44A shown in FIG. 10, a corner rim circumferential wall cell 42ba disposed in each corner portion of the honeycomb segment 44 constitutes the outflow cell 42x.

Also in the plugged honeycomb segment 44A shown in FIG. 10, an outflow open area $S1_{out}$ of the corner rim circumferential wall cell 42ba is 1.1 times or more as large as an average outflow open area $S2_{out}$ of non-corner rim circumferential wall cells 42bb.

The outflow cells 42x include whole rim partition wall cells 42a having a square sectional shape, and rim circumferential wall cells 42b. The rim circumferential wall cells 42b of the outflow cells 42x include the corner rim circumferential wall cells 42ba arranged in corner portions of the honeycomb segment 44, and the non-corner rim circumferential wall cells 42bb having a pentagonal sectional shape.

The inflow cells 42y include the whole rim partition wall cells 42a having a pentagonal sectional shape, and the rim circumferential wall cells 42b. Furthermore, the rim circumferential wall cell 42b of the inflow cell 42y constitutes the non-corner rim circumferential wall cell 42bb including a shape of a part of the whole rim partition wall cell 42a having a square sectional shape, and having a rectangular sectional shape.

In the plugged honeycomb segment 44A shown in FIG. 10, it is preferable that an outflow open area $S1_{out}$ of the corner rim circumferential wall cell 42ba is 1.4 times or more as large as an average outflow open area $S2_{out}$ of the non-corner rim circumferential wall cells 42bb. Furthermore, the outflow open area $S1_{out}$ of the corner rim circumferential wall cell 42ba is further preferably smaller than 4.0 times and especially preferably 3.5 times or less as large as the average outflow open area $S2_{out}$ of the non-corner rim circumferential wall cells 42bb.

The plugged honeycomb structure of the fourth embodiment is constituted by using a plugged honeycomb segment 54A shown in FIG. 11. A honeycomb segment 54 has porous partition walls 51 arranged to surround a plurality of cells 52, and segment circumferential walls 53 arranged at an outermost circumference. Plugging portions 55 are arranged in open ends of outflow cells 52x and open ends of inflow cells 52y in the honeycomb segment 54. Furthermore, except for a circumferential region of the honeycomb segment 54, the plugging portions 55 are arranged in open ends of the cells 52 so that the inflow cells 52y surround the outflow cell 52x.

The plugged honeycomb segment 54A shown in FIG. 11 has "repeated arrangement patterns" each including the outflow cell 52x having a quadrangular sectional shape and the inflow cells 52y having a pentagonal sectional shape. The honeycomb segment 54 in the plugged honeycomb segment 54A shown in FIG. 11 is constituted similarly to the honeycomb segment 34 in the plugged honeycomb segment 34A of the second embodiment shown in FIG. 9. However, the plugged honeycomb segment 54A shown in FIG. 11 is different from the plugged honeycomb segment 34A of the second embodiment shown in FIG. 9 in arrangement of the plugging portions 55. More specifically, in the plugged honeycomb segment 54A shown in FIG. 11, corner rim circumferential wall cells 52ba arranged in corner portions of the honeycomb segment 54 constitute the outflow cells 52x.

In the plugged honeycomb segment 54A shown in FIG. 11, an outflow open area $S1_{out}$ of the corner rim circumferential wall cell 52ba is 1.1 times or more as large as an average outflow open area $S2_{out}$ of non-corner rim circumferential wall cells 52bb.

The outflow cells 52x include whole rim partition wall cells 52a having a square sectional shape, and rim circumferential wall cells 52b. Furthermore, the rim circumferential wall cells 52b of the outflow cells 52x include the corner rim circumferential wall cells 52ba arranged in the corner portions of the honeycomb segment 54, and the non-corner rim circumferential wall cells 52bb having a pentagonal sectional shape.

The inflow cells 52y include the whole rim partition wall cells 52a having a pentagonal sectional shape, and the rim circumferential wall cells 52b. Furthermore, the rim circumferential wall cell 52b of the inflow cell 52y constitutes the non-corner rim circumferential wall cell 52bb including a shape of a part of the whole rim partition wall cell 52a having a square sectional shape, and having a rectangular sectional shape.

In the plugged honeycomb segment 54A shown in FIG. 11, it is preferable that an outflow open area $S1_{out}$ of the corner rim circumferential wall cell 52ba is 1.2 times or more as large as an average outflow open area $S2_{out}$ of the non-corner rim circumferential wall cells 52bb. Furthermore, the outflow open area $S1_{out}$ of the corner rim circumferential wall cell 52ba is further preferably smaller than 4.0 times and especially preferably 2.0 times or less as large as the average outflow open area $S2_{out}$ of the non-corner rim circumferential wall cells 52bb.

Also as to the plugged honeycomb structures of the second embodiment to the fourth embodiment hitherto described, similarly to the plugged honeycomb structure of the first embodiment, it is possible to inhibit increase of pressure loss due to deposition of incombustible particulate matter while maintaining isostatic strength. It is to be noted that the plugged honeycomb structure of the present invention is not limited to the first embodiment to the fourth embodiment hitherto described, as long as the above-mentioned condition (a) or (b) is satisfied. In other words, the inflow open area $S1_{in}$ of the corner rim circumferential wall cell may be 1.1 times or more as large as the average inflow open area $S2_{in}$ of the non-corner rim circumferential wall cells, or the outflow open area $S1_{out}$ of the corner rim circumferential wall cell may be 1.1 times or more as large as the average outflow open area $S2_{out}$ of the non-corner rim circumferential wall cells. For example, in the plugged honeycomb structures of the first embodiment to the fourth embodiment hitherto described, "the cell shapes" or "the repeated arrangement patterns of the cells" in each honeycomb segment are suitably changeable. Furthermore, in the plugged honeycomb segment shown in each drawing, depiction of the number of "the repeated arrangement patterns of the cells" in a central portion or the like is simplified for the sake of convenience in description. For example, the plugged honeycomb segment in each drawing shows an example where four "cell repeated arrangement patterns" are arranged in the inflow end face, but the number of "the cell repeated arrangement patterns" or the like is not limited to that shown in each drawing.

Next, further embodiments of the plugged honeycomb structure of the present invention will be described with reference to FIG. 12 to FIG. 25. FIG. 12 to FIG. 25 are plan views schematically showing plugged honeycomb segments for use in the further embodiments of the plugged honeycomb structure of the present invention, and seen from an inflow end face side. Furthermore, it is preferable that plugged honeycomb structures of the after-mentioned other embodiments are constituted similarly to the first embodiment except that the plugged honeycomb segments are constituted as shown in FIG. 12 to FIG. 25, respectively.

In each of FIG. 12 to FIG. 25, (a) and (b) show two types of plugged honeycomb segments different from each other in constitution of corner rim circumferential wall cells. In each figure, (a) shows the plugged honeycomb segment having two corner rim circumferential wall cells divided in two equal cells by a partition wall extending in a diagonal direction. In each figure, (b) shows the plugged honeycomb segment having each corner rim circumferential wall cell having one coupled shape of the two corner rim circumferential wall cells which is obtained by removing the partition wall that divides the corner rim circumferential wall cell into the two equal cells.

FIG. 12 to FIG. 23 show plugged honeycomb segments 64A to 64X each including a honeycomb segment 64 and plugging portions 65. The honeycomb segment 64 has porous partition walls 61 arranged to surround a plurality of cells 62, and segment circumferential walls 63 arranged at an outermost circumference. Plugging portions 65 are arranged in open ends of outflow cells 62x and open ends of inflow cells 62y in the honeycomb segment 64. Furthermore, except for a circumferential region of the honeycomb segment 64, the plugging portions 65 are arranged in open ends of the cells 62 so that the inflow cells 62y surround the outflow cell 62x.

The plugged honeycomb segments 64A to 64D, 64I to 64L and 64Q to 64T shown in FIG. 12, FIG. 13, FIG. 16, FIG. 17, FIG. 20 and FIG. 21 have "repeated arrangement patterns" each including the outflow cell 62x having a quadrangular sectional shape and the inflow cells 62y having a pentagonal sectional shape.

The plugged honeycomb segments 64E to 64H, 64M to 64P and 64U to 64X shown in FIG. 14, FIG. 15, FIG. 18, FIG. 19, FIG. 22 and FIG. 23 have "repeated arrangement patterns" each including the outflow cell 62x having a quadrangular sectional shape and the inflow cells 62y having a hexagonal sectional shape.

In each of FIG. 12 to FIG. 23, reference numeral 62a shows a whole rim partition wall cell and reference numeral 62b shows a rim circumferential wall cell. Furthermore, reference numeral 62ba shows a corner rim circumferential wall cell and reference numeral 62bb shows a non-corner rim circumferential wall cell.

In FIG. 12, FIG. 14, FIG. 16, FIG. 18, FIG. 20 and FIG. 22, an inflow open area $S1_{in}$ of each corner rim circumferential wall cell 62ba is 1.1 times or more as large as an average inflow open area $S2_{in}$ of the non-corner rim circumferential wall cells 62bb. On the other hand, in FIG. 13, FIG. 15, FIG. 17, FIG. 19, FIG. 21 and FIG. 23, an outflow open area $S1_{out}$ of the corner rim circumferential wall cell 62ba is 1.1 times or more as large as an average outflow open area $S2_{out}$ of the non-corner rim circumferential wall cells 62bb.

In each of the plugged honeycomb segments 64A to 64X shown in FIG. 12 to FIG. 23, a shape of each non-corner rim circumferential wall cell 62bb includes a part of a shape of each cell 62 constituting "the repeated arrangement patterns" of each of the plugged honeycomb segments 64A to 64X.

For example, in FIG. 12 to FIG. 15, a shape of the non-corner rim circumferential wall cell 62bb having a rectangular sectional shape is a shape divided at a position of 50% of a length of one side of the whole rim partition wall cell having a square sectional shape. In FIG. 16 to FIG. 19, a shape of each non-corner rim circumferential wall cell 62bb having a square sectional shape is the same as in a shape of the whole rim partition wall cell having a square sectional shape. In FIG. 20 to FIG. 23, a shape of each non-corner rim circumferential wall cell 62bb having a rectangular sectional shape is a shape divided at a position of 15% of a length of one side of the whole rim partition wall cell having a square sectional shape.

Figure 24:
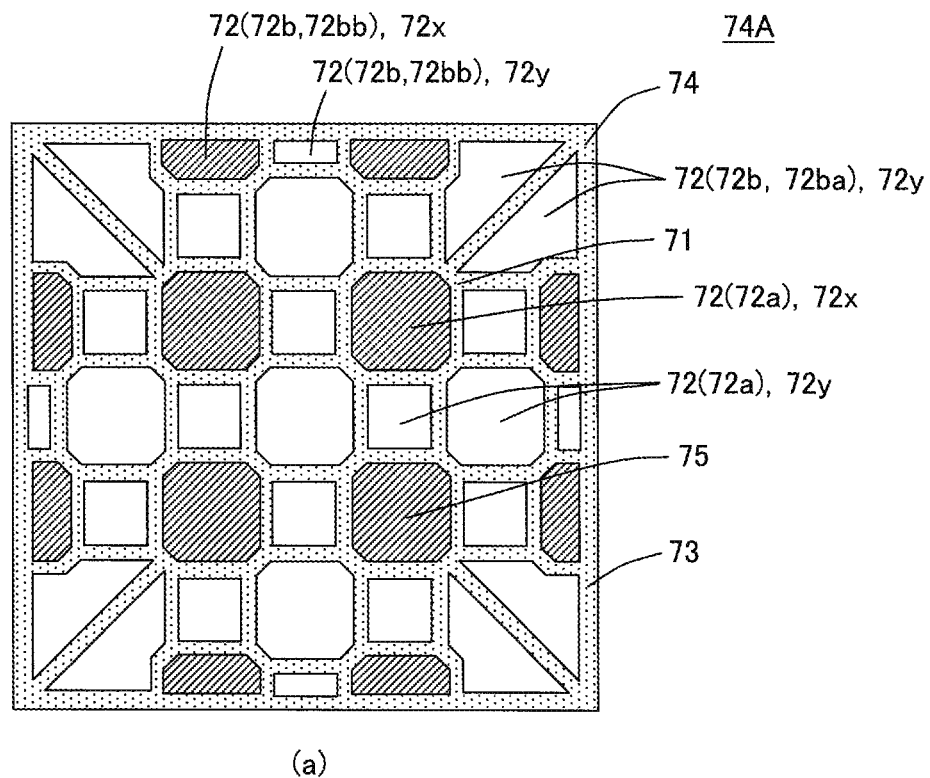
FIG. 24 is a plan view schematically showing a plugged honeycomb segment for use in a further embodiment of the plugged honeycomb structure of the present invention and seen from an inflow end face side.
Figure 24:
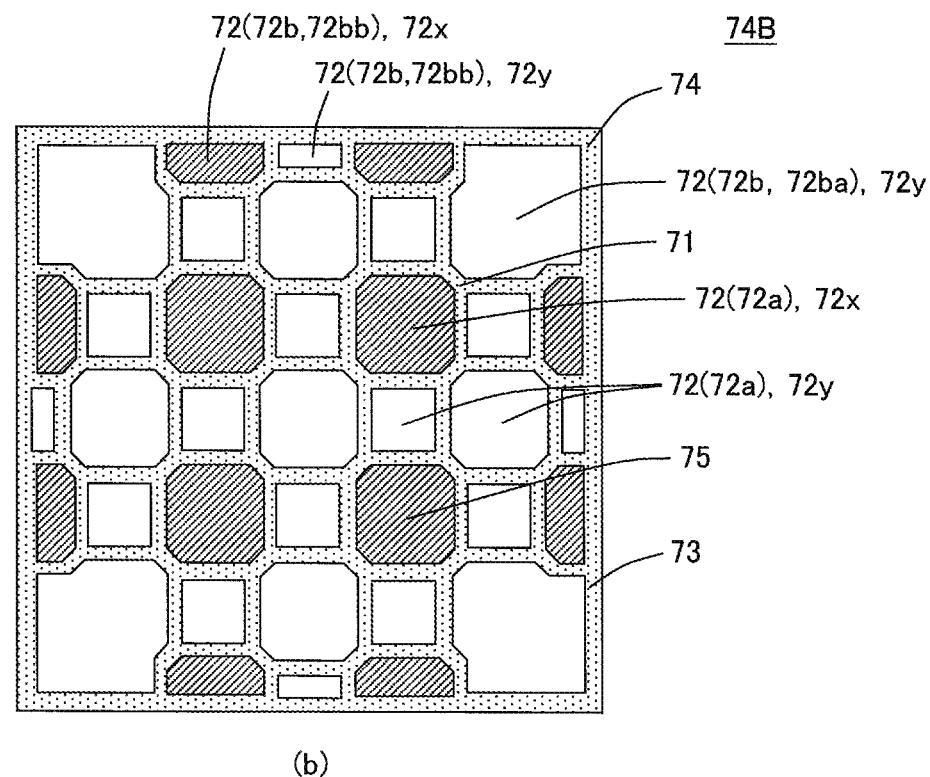
Figure 25:
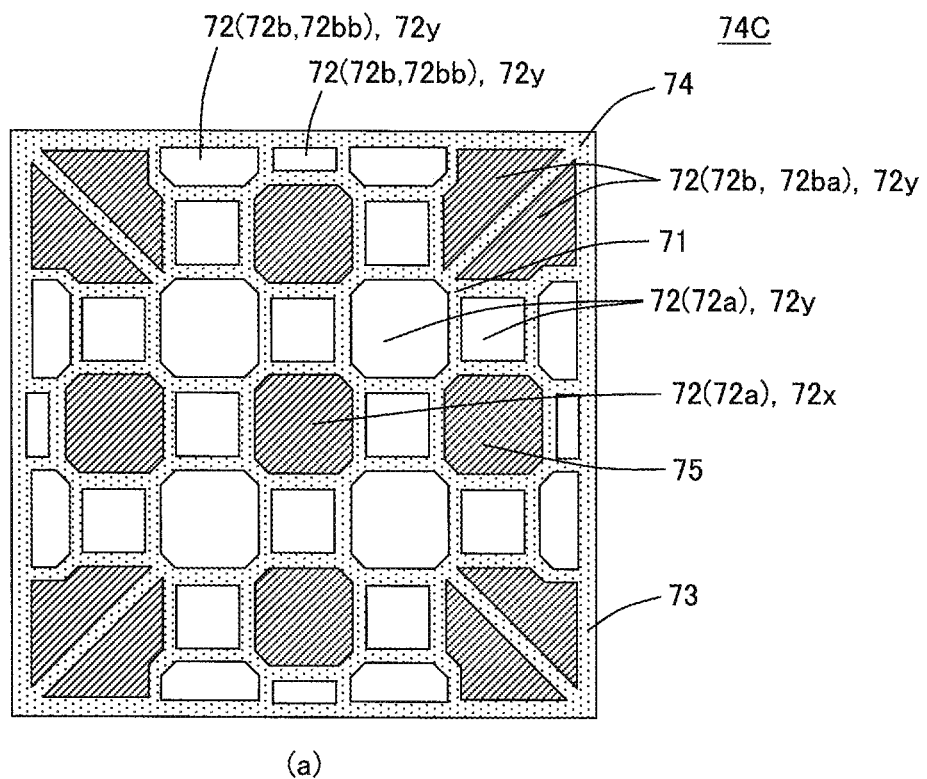
FIG. 25 is a plan view schematically showing a plugged honeycomb segment for use in a still further embodiment of the plugged honeycomb structure of the present invention and seen from an inflow end face side.
Figure 25:
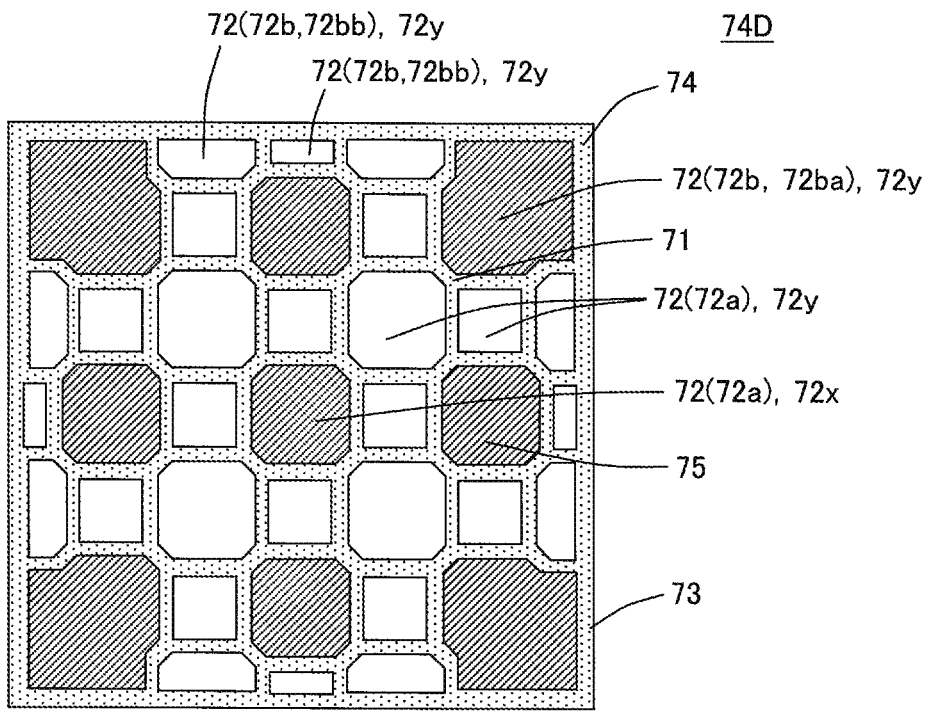

FIG. 24 and FIG. 25 show plugged honeycomb segments 74A to 74D each including a honeycomb segment 74 and plugging portions 75. The honeycomb segment 74 has porous partition walls 71 arranged to surround a plurality of cells 72, and segment circumferential walls 73 arranged at an outermost circumference. The plugging portions 75 are arranged in open ends of outflow cells 72$x$ and open ends of inflow cells 72$y$ in the honeycomb segment 74. Furthermore, except for a circumferential region of the honeycomb segment 74, the plugging portions 75 are arranged in open ends of the cells 72 so that the inflow cells 72$y$ surround the outflow cell 72$x$.

Each of the plugged honeycomb segments 74A to 74D shown in FIG. 24 and FIG. 25 has "repeated arrangement patterns" each including the outflow cell 72$x$ having an octagonal sectional shape and the inflow cells 72$y$ having quadrangular and octagonal sectional shapes.

In each of FIG. 24 and FIG. 25, reference numeral 72$a$ indicates a whole rim partition wall cell and reference numeral 72$b$ indicates a rim circumferential wall cell. Furthermore, reference numeral 72$ba$ indicates a corner rim circumferential wall cell and reference numeral 72$bb$ indicates a non-corner rim circumferential wall cell. In FIG. 24 and FIG. 25, an inflow open area $S1_{in}$ of each corner rim circumferential wall cell 72$ba$ is 1.1 times or more as large as an average inflow open area $S2_{in}$ of the non-corner rim circumferential wall cells 72$bb$. In each of the plugged honeycomb segments 74A to 74D, a shape of the non-corner rim circumferential wall cell 72$bb$ includes a shape of a part of each cell 72 constituting "the repeated arrangement patterns" of each of the plugged honeycomb segments 74A to 74D.

(2) Manufacturing Method of Plugged Honeycomb Structure:

There are not any special restrictions on a manufacturing method of the plugged honeycomb structure of the present embodiment shown in FIG. 1 to FIG. 5, and the plugged honeycomb structure can be manufactured by, for example, such a method as described below. Initially, a plastic kneaded material to prepare the honeycomb segments is prepared. The kneaded material to prepare the honeycomb segments can be prepared by suitably adding an additive such as a binder and water to a material selected as raw material powder from the above-mentioned suitable material of the honeycomb segments.

Next, the kneaded material obtained in this manner is extruded to prepare a prismatic columnar honeycomb formed body having partition walls arranged to surround a plurality of cells, and segment circumferential walls arranged at an outermost circumference. A plurality of honeycomb formed bodies are prepared.

Each obtained honeycomb formed body is dried with, for example, microwaves and hot air, and open ends of the cells are plugged with a material similar to the material used in preparing the honeycomb formed body, to prepare plugging portions. The honeycomb formed body may further be dried after the plugging portions are prepared.

Next, the honeycomb formed body including the prepared plugging portions is fired, to obtain the plugged honeycomb segment. A firing temperature and a firing atmosphere vary with the raw materials, and the person skilled in the art can select the firing temperature and the firing atmosphere which are optimum for the selected material. Next, a plurality of plugged honeycomb segments are bonded to one another by use of a bonding material, and dried to harden. Afterward, a circumference is processed into a desirable shape, whereby the plugged honeycomb structure of the segmented structure is obtainable. As the bonding material, a ceramic material pasted by adding a liquid medium such as water thereto is usable. Furthermore, a processed surface obtained by processing the circumference of a bonded body of the plugged honeycomb segments has a state where the cells are exposed, and hence the outer wall 8 may be formed by coating the processed surface with a circumference coating material as shown in FIG. 1. As a material of the circumference coating material, for example, the same material as in the bonding material is usable.

EXAMPLES

Comparative Example 1

As a ceramic raw material, a mixed raw material was prepared by mixing silicon carbide (SiC) powder and metal silicon (Si) powder at a mass ratio of 80:20. To this mixed raw material, hydroxypropyl methylcellulose was added as a binder, a water absorbable resin was added as a pore former, and water was also added, to prepare a forming raw material. The obtained forming raw material was kneaded by using a kneader, to obtain a kneaded material.

Next, the obtained kneaded material was formed by using a vacuum extruder, to prepare 16 quadrangular prismatic columnar honeycomb segments each having repeated arrangement patterns similar to those of a plugged honeycomb segment 104A shown in FIG. 26. Here, FIG. 26 is a plan view schematically showing the plugged honeycomb segment for use in a plugged honeycomb structure of Comparative Example 1 and seen from an inflow end face side.

In FIG. 26, reference numeral 104 indicates a honeycomb segment and reference numeral 105 indicates a plugging portion. The honeycomb segment 104 has porous partition walls 101 arranged to surround a plurality of cells 102, and segment circumferential walls 103 arranged at an outermost circumference. The plugging portions 105 are arranged in open ends of outflow cells 102$x$ and open ends of inflow cells 102$y$ in the honeycomb segment 104. Furthermore, except for a circumferential region of the honeycomb segment 104, the plugging portions 105 are arranged in the open ends of the cells 102 so that the inflow cells 102$y$ surround the outflow cell 102$x$. The plugged honeycomb segment 104A shown in FIG. 26 has "repeated arrangement patterns" each including the outflow cell 102$x$ having a quadrangular sectional shape and the inflow cells 102$y$ having a pentagonal sectional shape.

The quadrangular outflow cells 102$x$ include whole rim partition wall cells 102$a$ having a square sectional shape, and rim circumferential wall cells 102$b$ each including a shape of a part of the whole rim partition wall cell 102$a$. Furthermore, the rim circumferential wall cells 102$b$ of the outflow cells 102$x$ further include corner rim circumferential wall cells 102$ba$ having a square sectional shape and non-corner rim circumferential wall cells 102$bb$ having a rectangular sectional shape. The pentagonal inflow cells 102$y$ include the whole rim partition wall cells 102$a$ having a pentagonal sectional shape and the non-corner rim circumferential wall cells 102$bb$ having the same sectional shape as in the whole rim partition wall cells 102$a$.

Next, the obtained honeycomb segments were dried by high frequency induction heating, and then dried by using a hot air drier at 120° C. for 2 hours. Furthermore, during the drying, the honeycomb segment was disposed so that its outflow end face perpendicularly faced downward, and the honeycomb segment was dried.

Plugging portions were formed in the dried honeycomb segments. Initially, an inflow end face of each honeycomb segment was masked. Next, a masked end portion (the end portion on the side of the inflow end face) was immersed into a plugging slurry to charge the plugging slurry into open ends of cells (outflow cells) which were not masked. Thus, the plugging portions were formed on the inflow end face side of the honeycomb segment. Afterward, an outflow end face of the dried honeycomb segment was similarly masked and immersed, to form plugging portions also in inflow cells.

Then, each honeycomb segment including the formed plugging portions was degreased and fired to obtain a plugged honeycomb segment. As to degreasing conditions, the degreasing was performed at 550° C. for 3 hours, and as to firing conditions, the firing was performed at 1450° C. under argon atmosphere for 2 hours. During the firing, the honeycomb segment including the formed plugging portions was disposed so that its outflow end face perpendicularly faced downward, and the honeycomb segment was fired.

As described above, the plugged honeycomb segments for use in manufacturing the plugged honeycomb structure of Comparative Example 1 were prepared. Outflow cells of each prepared plugged honeycomb segment included whole rim partition wall cells having a square sectional shape and rim circumferential wall cells each including a shape of at least a part of each whole rim partition wall cell in the same manner as in the plugged honeycomb segment shown in FIG. 26. Furthermore, the rim circumferential wall cells of the outflow cells further included corner rim circumferential wall cells and non-corner rim circumferential wall cells. Inflow cells included whole rim partition wall cells having a pentagonal sectional shape and non-corner rim circumferential wall cells having the same sectional shape as in the whole rim partition wall cells. Design of the plugged honeycomb segment including the inflow cells and outflow cells having the above-mentioned constitutions is defined as "design E". Table 1 shows the design of the plugged honeycomb segment used in Comparative Example 1 in a column of "design".

In each prepared plugged honeycomb segment, a cross section perpendicular to an axial direction was square, and a length of one side of this square shape (a segment size) was 37.9 mm. Furthermore, a length of the honeycomb segment in the axial direction was 152.4 mm. Furthermore, in the plugged honeycomb segment, a distance P shown in FIG. 26 was 2.5 mm, a distance Q was 1.4 mm, and a thickness of partition walls was 0.38 mm. Table 1 shows values of "the segment size (one side) (mm)", "the partition wall thickness (mm)", "the distance P (mm)" and "the distance Q (mm)"

Furthermore, in the prepared plugged honeycomb segment, a thickness of a segment circumferential wall was 0.5 mm. Table 1 shows the thickness of the segment circumferential wall in a column of "segment circumferential wall thickness (mm)".

As to the prepared plugged honeycomb segment, an outflow open area of each corner rim circumferential wall cell and an average outflow open area of the non-corner rim circumferential wall cells were measured. Hereinafter, the outflow open area of the corner rim circumferential wall cell is defined as "an outflow open area $S1_{out}$" and the average outflow open area of the non-corner rim circumferential wall cells is defined as "an average outflow open area $S2_{out}$". The outflow open area $S1_{out}$ was 0.5 times as large as the average outflow open area $S2_{out}$. In other words, a value obtained by dividing a value of "the outflow open area $S1_{out}$" by a value of "the average outflow open area $S2_{out}$" was 0.5. Table 1 shows, in a column of "$S1_{out}/S2_{out}$", the value obtained by dividing the value of "the outflow open area $S1_{out}$" by the value of "the average outflow open area $S2_{out}$". It is to be noted that when the segment size is 37.9 mm, the length of one side of the non-corner rim circumferential wall cell having the quadrangular sectional shape is 50% of the length of one size of the whole rim partition wall cell having the square sectional shape.

The 16 fired plugged honeycomb segments were monolithically bonded by using a bonding material. The bonding material included inorganic particles and an inorganic adhesive as main components, and included an organic binder, a surfactant, a foamable resin, water and others as subcomponents. As the inorganic particles, plate-shaped particles were used, and as the inorganic adhesive, colloidal silica (silica sol) was used. As the plate-shaped particles, mica was used. A circumference of a honeycomb segment bonded body obtained by monolithically bonding the 16 honeycomb segments was ground and processed in a round pillar shape, and its circumferential surface was coated with a coating material, to obtain the plugged honeycomb structure of Comparative Example 1. In the plugged honeycomb structure of Comparative Example 1, a diameter of each end face was 143.8 mm. The coating material included ceramic powder, water and a bonding agent. A thickness of a bonding layer made of the bonding material was 1 mm. Table 1 shows the thickness of the bonding layer in a column of "bonding layer thickness (mm)"

TABLE 1

| | Design | Segment size (one side) [mm] | Partition wall thickness [mm] | P [mm] | Q [mm] | S1in/S2in | S1out/S2out | Bonding layer thickness [mm] | Segment circumferential wall thickness [mm] |
|---|---|---|---|---|---|---|---|---|---|
| Comparative Example 1 | Design E | 37.9 | 0.38 | 2.5 | 1.4 | — | 0.5 | 1 | 0.5 |
| Example 1 | Design A | 37.9 | 0.38 | 2.5 | 1.4 | 1.4 | — | 1 | 0.5 |
| Example 2 | Design B | 37.9 | 0.38 | 2.5 | 1.4 | 3.6 | — | 1 | 0.5 |
| Example 3 | Design C | 37.9 | 0.38 | 2.5 | 1.4 | — | 1.4 | 1 | 0.5 |
| Example 4 | Design D | 37.9 | 0.38 | 2.5 | 1.4 | — | 3.6 | 1 | 0.5 |
| Example 5 | Design A | 37.9 | 0.38 | 2.5 | 1.4 | 1.4 | — | 1.5 | 0.5 |
| Example 6 | Design A | 37.9 | 0.38 | 2.5 | 1.4 | 1.4 | — | 1.6 | 0.5 |
| Example 7 | Design A | 37.9 | 0.38 | 2.5 | 1.4 | 1.4 | — | 0.5 | 0.5 |
| Example 8 | Design A | 37.9 | 0.38 | 2.5 | 1.4 | 1.4 | — | 0.4 | 0.5 |
| Example 9 | Design A | 38.9 | 0.38 | 2.5 | 1.4 | 1.4 | — | 1 | 1 |
| Example 10 | Design A | 39.1 | 0.38 | 2.5 | 1.4 | 1.4 | — | 1 | 1.1 |
| Example 11 | Design A | 37.5 | 0.38 | 2.5 | 1.4 | 1.4 | — | 1 | 0.3 |
| Example 12 | Design A | 37.3 | 0.38 | 2.5 | 1.4 | 1.4 | — | 1 | 0.2 |
| Example 13 | Design A | 40.0 | 0.38 | 2.5 | 1.4 | 2.0 | — | 1 | 0.5 |
| Example 14 | Design B | 40.0 | 0.38 | 2.5 | 1.4 | 4.5 | — | 1 | 0.5 |
| Example 15 | Design A | 36.4 | 0.38 | 2.5 | 1.4 | 1.1 | — | 1 | 0.5 |
| Example 16 | Design B | 36.4 | 0.38 | 2.5 | 1.4 | 3.1 | — | 1 | 0.5 |

Example 1

The procedure of Comparative Example 1 was repeated to prepare a kneaded material, and the obtained kneaded material was formed by using a vacuum extruder, to prepare 16 quadrangular prismatic columnar honeycomb segments each having repeated arrangement patterns similar to those of the plugged honeycomb segment 34A shown in FIG. 9. It is to be noted that in each of "the repeated arrangement patterns similar to those of the plugged honeycomb segment 34A shown in FIG. 9", eight inflow cells having a pentagonal sectional shape are arranged to surround the outflow cell having a square sectional shape.

Each prepared honeycomb segment had two corner rim circumferential wall cells which were two equal cells divided by a partition wall extending in a diagonal direction, in each corner portion of the honeycomb segment in the same manner as in the plugged honeycomb segment 34A shown in FIG. 9. "The two corner rim circumferential wall cells" arranged in each corner portion of the honeycomb segment had a size equal to a coupled size of a corner rim circumferential wall cell and non-corner rim circumferential wall cells adjacent to the corner rim circumferential wall cell in the honeycomb segment of Comparative Example 1.

Next, the obtained honeycomb segments were dried by a method similar to Comparative Example 1. Next, plugging portions were formed in each dried honeycomb segment to constitute repeated arrangement patterns similar to those of the plugged honeycomb segment 34A shown in FIG. 9. Design of the plugged honeycomb segment including the inflow cells and outflow cells having the above-mentioned constitutions is defined as "design A". Table 1 shows the design of the plugged honeycomb segment used in Example 1 in a column of "design".

In each prepared plugged honeycomb segment, a cross section perpendicular to an axial direction was square, and a length of one side of this square shape (a segment size) was 37.9 mm. Furthermore, a length of the honeycomb segment in the axial direction was 152.4 mm. Furthermore, in the plugged honeycomb segment, a distance P shown in FIG. 9 was 2.5 mm, a distance Q was 1.4 mm, and a thickness of partition walls was 0.38 mm. Table 1 shows values of "the segment size (one side) (mm)", "the partition wall thickness (mm)", "the distance P (mm)" and "the distance Q (mm)". Furthermore, in the prepared plugged honeycomb segment, a thickness of a segment circumferential wall was 0.5 mm. Table 1 shows the thickness of the segment circumferential wall in a column of "segment circumferential wall thickness (mm)". Furthermore, the plugged honeycomb structure of Example 1 has a constitution in which the distance P and distance Q have the same lengths in a longitudinal direction and a lateral direction as shown in FIG. 9.

As to the prepared plugged honeycomb segment, an inflow open area of each corner rim circumferential wall cell and an average inflow open area of non-corner rim circumferential wall cells were measured. Hereinafter, the inflow open area of the corner rim circumferential wall cell is defined as "an inflow open area $S1_{in}$" and the average inflow open area of the non-corner rim circumferential wall cells is defined as "an average inflow open area $S2_{in}$". The inflow open area $S1_{in}$ was 1.4 times as large as the average inflow open area $S2_{in}$. In other words, a value obtained by dividing a value of "the inflow open area $S1_{in}$" by a value of "the average inflow open area $S2_{in}$" was 1.4. Table 1 shows, in a column of "$S1_{in}/S2_{in}$", the value obtained by dividing the value of "the inflow open area $S1_{in}$" by the value of "the average inflow open area $S2_{in}$".

The 16 fired plugged honeycomb segments were monolithically bonded by using a bonding material. The bonding material similar to a bonding material used in Comparative Example 1 was used.

Example 2

The procedure of Comparative Example 1 was repeated to prepare a kneaded material, and the obtained kneaded material was formed by using a vacuum extruder, to prepare 16 quadrangular prismatic columnar honeycomb segments each having repeated arrangement patterns similar to those of the plugged honeycomb segment 4A shown in FIG. 7. It is to be noted that in each of "the repeated arrangement patterns similar to those of the plugged honeycomb segment 4A shown in FIG. 7", eight inflow cells having a pentagonal sectional shape are arranged to surround an outflow cell having a square sectional shape.

Each prepared honeycomb segment had a pentagonal corner rim circumferential wall cell in each corner portion of the honeycomb segment in the same manner as in the plugged honeycomb segment 4A shown in FIG. 7. "The pentagonal corner rim circumferential wall cell" disposed in each corner portion of the honeycomb segment had a size equal to a coupled size of a corner rim circumferential wall cell and non-corner rim circumferential wall cells adjacent to the corner rim circumferential wall cell in the honeycomb segment of Comparative Example 1.

Next, the obtained honeycomb segments were dried by a method similar to Comparative Example 1. Next, plugging portions were formed in each dried honeycomb segment to constitute repeated arrangement patterns similar to those of the plugged honeycomb segment 4A shown in FIG. 7. Design of each plugged honeycomb segment including the inflow cells and outflow cells having the above-mentioned constitutions is defined as "design B". Table 1 shows the design of the plugged honeycomb segment used in Example 2 in a column of "design".

In each prepared plugged honeycomb segment, a cross section perpendicular to an axial direction was square, and a length of one side of this square shape (a segment size) was 37.9 mm. Furthermore, a length of the honeycomb segment in the axial direction was 152.4 mm. Furthermore, in the plugged honeycomb segment, a distance P shown in FIG. 7 was 2.5 mm, a distance Q was 1.4 mm, and a thickness of partition walls was 0.38 mm. Table 1 shows values of "the segment size (one side) (mm)", "the partition wall thickness (mm)", "the distance P (mm)" and "the distance Q (mm)". Furthermore, in the prepared plugged honeycomb segment, a thickness of a segment circumferential wall was 0.5 mm. Table 1 shows the thickness of the segment circumferential wall in a column of "segment circumferential wall thickness (mm)". It is to be noted that the plugged honeycomb structure of Example 2 has a constitution in which the distance P and distance Q have the same lengths in a longitudinal direction and a lateral direction as shown in FIG. 7.

As to the prepared plugged honeycomb segment, an inflow open area $S1_{in}$ of each corner rim circumferential wall cell and an average inflow open area $S2_{in}$ of non-corner rim circumferential wall cells were measured. The inflow open area $S1_{in}$ was 3.6 times as large as the average inflow open area $S2_{in}$. In other words, a value obtained by dividing a value of "the inflow open area $S1_{in}$" by a value of "the average inflow open area $S2_{in}$" was 3.6. Table 1 shows the result.

The 16 fired plugged honeycomb segments were monolithically bonded by using a bonding material. The bonding material similar to a bonding material used in Comparative Example 1 was used.

Example 3

The procedure of Comparative Example 1 was repeated to prepare a kneaded material, and the obtained kneaded material was formed by using a vacuum extruder, to prepare 16 quadrangular prismatic columnar honeycomb segments each having repeated arrangement patterns similar to those of the plugged honeycomb segment 54A shown in FIG. 11. It is to be noted that in each of "the repeated arrangement patterns similar to those of the plugged honeycomb segment 54A shown in FIG. 11", eight inflow cells having a pentagonal sectional shape are arranged to surround an outflow cell having a square sectional shape.

Each prepared honeycomb segment had two corner rim circumferential wall cells which were two equal cells divided by a partition wall extending in a diagonal direction, in each corner portion of the honeycomb segment in the same manner as in the plugged honeycomb segment 54A shown in FIG. 11. "The two corner rim circumferential wall cells" arranged in each corner portion of the honeycomb segment had a size equal to a coupled size of a corner rim circumferential wall cell and non-corner rim circumferential wall cells adjacent to the corner rim circumferential wall cell in the honeycomb segment of Comparative Example 1.

Next, the obtained honeycomb segments were dried by a method similar to Comparative Example 1. Next, plugging portions were formed in each dried honeycomb segment to constitute repeated arrangement patterns similar to those of the plugged honeycomb segment 54A shown in FIG. 11. Design of each plugged honeycomb segment including the inflow cells and outflow cells having the above-mentioned constitutions is defined as "design C". Table 1 shows the design of the plugged honeycomb segment used in Example 3 in a column of "design".

In each prepared plugged honeycomb segment, a cross section perpendicular to an axial direction was square, and a length of one side of this square shape (a segment size) was 37.9 mm. Furthermore, a length of the honeycomb segment in the axial direction was 152.4 mm. Furthermore, in the plugged honeycomb segment, a distance P shown in FIG. 11 was 2.5 mm, a distance Q was 1.4 mm, and a thickness of partition walls was 0.38 mm. Table 1 shows values of "the segment size (one side) (mm)", "the partition wall thickness (mm)", "the distance P (mm)" and "the distance Q (mm)". Furthermore, in the prepared plugged honeycomb segment, a thickness of a segment circumferential wall was 0.5 mm. Table 1 shows the thickness of the segment circumferential wall in a column of "segment circumferential wall thickness (mm)". Furthermore, the plugged honeycomb structure of Example 3 has a constitution in which the distance P and distance Q have the same lengths in a longitudinal direction and a lateral direction as shown in FIG. 11.

As to the prepared plugged honeycomb segment, an outflow open area $S1_{out}$ of each corner rim circumferential wall cell and an average outflow open area $S2_{out}$ of non-corner rim circumferential wall cells were measured. The outflow open area $S1_{out}$ was 1.4 times as large as the average outflow open area $S2_{out}$. Table 1 shows the result.

The 16 fired plugged honeycomb segments were monolithically bonded by using a bonding material. The bonding material similar to a bonding material used in Comparative Example 1 was used.

Example 4

The procedure of Comparative Example 1 was repeated to prepare a kneaded material, and the obtained kneaded material was formed by using a vacuum extruder, to prepare 16 quadrangular prismatic columnar honeycomb segments each having repeated arrangement patterns similar to those of the plugged honeycomb segment 44A shown in FIG. 10. It is to be noted that in each of "the repeated arrangement patterns similar to those of the plugged honeycomb segment 44A shown in FIG. 10", eight inflow cells having a pentagonal sectional shape are arranged to surround an outflow cell having a square sectional shape.

Each prepared honeycomb segment had a pentagonal corner rim circumferential wall cell in each corner portion of the honeycomb segment in the same manner as in the plugged honeycomb segment 44A shown in FIG. 10. "The pentagonal corner rim circumferential wall cell" disposed in each corner portion of the honeycomb segment had a size equal to a coupled size of a corner rim circumferential wall cell and non-corner rim circumferential wall cells adjacent to the corner rim circumferential wall cell in the honeycomb segment of Comparative Example 1.

Next, the obtained honeycomb segments were dried by a method similar to Comparative Example 1. Next, plugging portions were formed in each dried honeycomb segment to constitute repeated arrangement patterns similar to those of the plugged honeycomb segment 44A shown in FIG. 10. Design of each plugged honeycomb segment including the inflow cells and outflow cells having the above-mentioned constitutions is defined as "design D". Table 1 shows the design of the plugged honeycomb segment used in Example 4 in a column of "design".

In each prepared plugged honeycomb segment, a cross section perpendicular to an axial direction was square, and a length of one side of this square shape (a segment size) was 37.9 mm. Furthermore, a length of the honeycomb segment in the axial direction was 152.4 mm. Furthermore, in the plugged honeycomb segment, a distance P shown in FIG. 10 was 2.5 mm, a distance Q was 1.4 mm, and a thickness of partition walls was 0.38 mm. Table 1 shows values of "the segment size (one side) (mm)", "the partition wall thickness (mm)", "the distance P (mm)" and "the distance Q (mm)". Furthermore, in the prepared plugged honeycomb segment, a thickness of a segment circumferential wall was 0.5 mm. Table 1 shows the thickness of the segment circumferential wall in a column of "segment circumferential wall thickness (mm)". Furthermore, the plugged honeycomb structure of Example 4 has a constitution in which the distance P and distance Q have the same lengths in a longitudinal direction and a lateral direction as shown in FIG. 10.

As to the prepared plugged honeycomb segment, an outflow open area $S1_{out}$ of each corner rim circumferential wall cell and an average outflow open area $S1_{out}$ of non-corner rim circumferential wall cells were measured. The outflow open area $S1_{out}$ was 3.6 times as large as the average outflow open area $S2_{out}$. Table 1 shows the result.

The 16 fired plugged honeycomb segments were monolithically bonded by using a bonding material. The bonding material similar to a bonding material used in Comparative Example 1 was used.

Examples 5 to 16

The procedure of Example 1 was repeated except that design of each honeycomb segment, a segment size, a thickness of a bonding layer and a thickness of each segment circumferential wall were changed as shown in Table 1, to prepare plugged honeycomb structures of Examples 5 to 16. It is to be noted that as to each honeycomb segment of each example, a size of an open area of each rim circumferential wall cell is changed in accordance with increase or decrease of the segment size. In Examples 13 and 14 where the segment size is 40.0 mm, a size of each non-corner rim circumferential wall cell having a quadrangular sectional shape is the same as a size of each whole rim partition wall cell having a square sectional shape. Furthermore, in Examples 15 and 16 where the segment size is 36.4 mm, a shape of each non-corner rim circumferential wall cell having a quadrangular sectional shape is a shape divided at a position of 15% of a length of one side of each whole rim partition wall cell having a square sectional shape.

As to each of the plugged honeycomb structures of Examples 1 to 16 and Comparative Example 1, pressure loss, isostatic strength and thermal shock resistance were evaluated by the following methods. Table 2 shows the evaluation results.

TABLE 2

|  | Pressure loss | Isostatic strength | Thermal shock resistance |
| --- | --- | --- | --- |
| Comparative Example 1 | Reference value | A | B |
| Example 1 | A | A | B |
| Example 2 | A | B | B |
| Example 3 | B | A | B |
| Example 4 | B | B | B |
| Example 5 | B | A | A |
| Example 6 | C | A | A |
| Example 7 | A | B | B |
| Example 8 | A | B | C |
| Example 9 | B | A | C |
| Example 10 | C | A | C |
| Example 11 | A | B | B |
| Example 12 | A | C | B |
| Example 13 | B | B | C |
| Example 14 | B | C | C |
| Example 15 | C | A | A |
| Example 16 | B | B | A |

(Pressure Loss)

Initially, masses of plugged honeycomb structures of Examples 1 to 16 and Comparative Example 1 were measured, respectively. Next, the plugged honeycomb structure of Comparative Example 1 was mounted in an exhaust system of a car including a mounted diesel engine for the car which had a displacement of 2.0 L. Then, a running test of the car was carried out to trap ash in an exhaust gas by the plugged honeycomb structure, and changes of pressure loss of the plugged honeycomb structure were measured. Then, when a value of the pressure loss increased as much as 3 kPa from initial pressure loss, the mass of the plugged honeycomb structure was measured. Then, a mass increase from the mass of the plugged honeycomb structure which was measured before the start of the measurement was calculated. The calculated mass increase was divided by a volume of the plugged honeycomb structure, to obtain an amount of ash deposited per unit volume (L) when the pressure loss increased as much as 3 kPa. Also as to each of the plugged honeycomb structures of Examples 1 to 16, the amount of the deposited ash was obtained in the same manner as in the above-mentioned method. Evaluation of the ash deposition pressure loss was carried out in accordance with the following evaluation standards.

Evaluation A: A ratio of the amount of the deposited ash was +20% or more to the amount of the deposited ash of Comparative Example 1.

Evaluation B: The ratio of the amount of the deposited ash was +10% or more and smaller than +20% to the amount of the deposited ash of Comparative Example 1.

Evaluation C: The amount of the deposited ash was larger than the amount of the deposited ash of Comparative Example 1 as much as a ratio smaller than +10%.

Evaluation D: The amount of the deposited ash was equal to or smaller than the amount of the deposited ash of Comparative Example 1.

(Isostatic Strength)

Measurement of the isostatic strength was carried out on the basis of an isostatic breakdown strength test stipulated in JASO Standard M505-87 of a car standard issued by the society of Automotive Engineers of Japan. In the isostatic breakdown strength test, the plugged honeycomb structure was placed in a rubber tubular container, the container was closed with a lid of an aluminum plate, and isotropic pressurizing compression was performed in water. In other words, the isostatic breakdown strength test was a test to simulate compressive load weighting when a circumferential surface of the plugged honeycomb structure was grasped in a can member. The isostatic strength measured by this isostatic breakdown strength test is indicated with a pressurizing pressure value (MPa) when the plugged honeycomb structure breaks down. The evaluation of the isostatic strength was carried out in accordance with the following evaluation standards.

Evaluation A: The isostatic strength was 3.0 MPa or more.

Evaluation B: The isostatic strength was 2.0 MPa or more and smaller than 3.0 MPa.

Evaluation C: The isostatic strength was 1.0 MPa or more and smaller than 2.0 MPa.

Evaluation D: The isostatic strength was smaller than 1.0 MPa.

(Thermal Shock Resistance)

The evaluation of a thermal shock resistance by an electric furnace spalling test was carried out on the basis of a method stipulated in JASO Standard M505-87 of a car standard issued by the society of Automotive Engineers of Japan. Specifically, the plugged honeycomb structure at room temperature was initially disposed in an electric furnace kept at a temperature higher as much as a predetermined temperature than room temperature and held in this state for 20 minutes. Afterward, the plugged honeycomb structure was taken out onto a refractory brick. In this state, the plugged honeycomb structure was left to stand naturally for 15 minutes or more, and cooled until the temperature reached room temperature, and it was checked whether or not damages such as cracks were generated in the plugged honeycomb structure. This operation was repeated until damages such as the cracks were generated in the plugged honeycomb structure. Furthermore, the temperature in the electric furnace was raised every 25° C. every time the above operation was repeated. The temperature in the electric furnace in the operation just before the operation in which it was confirmed that damages such as the cracks were generated in the plugged honeycomb structure was defined as a safe temperature of the plugged honeycomb structure. The evaluation of the thermal shock resistance was carried out in accordance with the following evaluation standards.

Evaluation A: The safe temperature was 500° C. or more.

Evaluation B: The safe temperature was 400° C. or more and lower than 500° C.

Evaluation C: The safe temperature was 300° C. or more and lower than 400° C.

Evaluation D: The safe temperature was lower than 300° C.

(Result)

In the plugged honeycomb structures of Examples 1 to 16, differently from the plugged honeycomb structure of Comparative Example 1 having reference values, increase of pressure loss during ash deposition was inhibited. Furthermore, the plugged honeycomb structures of Examples 1 to 16 obtained a suitable evaluation result such as the evaluation C or higher evaluation also in the evaluations of the isostatic strength and thermal shock resistance.

A plugged honeycomb structure of the present invention is utilizable as a trapping filter to remove particulates and the like included in an exhaust gas emitted from a direct injection type gasoline engine, a diesel engine or the like.

DESCRIPTION OF REFERENCE NUMERALS 1, 31, 41, 51, 61, 71 and 101: partition wall, 2, 32, 42, 52, 62, 72 and 102: cell, 2a, 32a, 42a, 52a, 62a, 72a and 102a: whole rim partition wall cell, 2b, 32b, 42b, 52b, 62b, 72b and 102b: rim circumferential wall cell, 2ba, 32ba, 42ba, 52ba, 62ba, 72ba and 102ba: corner rim circumferential wall cell, 2bb, 32bb, 42bb, 52bb, 62bb, 72bb and 102bb: non-corner rim circumferential wall cell, 2x, 32x, 42x, 52x, 62x, 72x and 102x: outflow cell (predetermined cell), 2y, 32y, 42y, 52y, 62y, 72y and 102y: inflow cell (residual cell), 3, 33, 43, 53, 63, 73 and 103: segment circumferential wall, 4, 34, 44, 54, 64, 74 and 104: honeycomb segment, 4A, 34A, 44A, 54A and 104A: plugged honeycomb segment, 5, 35, 45, 55, 65, 75 and 105: plugging portion, 6: bonding layer, 7: honeycomb segment bonded body, 8: outer wall, 11: inflow end face, 12: outflow end face, 13: first side, 14: second side, 15: third side, 16: fourth side, 100: plugged honeycomb structure, and P and Q: distance.

What is claimed is:

1. A plugged honeycomb structure comprising:
   a plurality of prismatic columnar honeycomb segments;
   a bonding layer bonding side surfaces of the plurality of honeycomb segments to one another; and
   plugging portions arranged in open ends of predetermined cells in an inflow end face of each honeycomb segment and arranged in open ends of residual cells in an outflow end face thereof,
   wherein each honeycomb segment has porous partition walls arranged to surround a plurality of cells extending from the inflow end face to the outflow end face, and segment circumferential walls arranged at an outermost circumference,
   in a cross section of the honeycomb segment which is perpendicular to an extending direction of the cells, at least two types of cells having different shapes are formed to constitute predetermined repeated arrangement patterns,
   the cells of the honeycomb segment include rim circumferential wall cells,
   the rim circumferential wall cells are the cells having rims surrounded with the partition walls and the segment circumferential walls,
   the rim circumferential wall cells include corner rim circumferential wall cells and non-corner rim circumferential wall cells,
   the corner rim circumferential wall cells are the rim circumferential wall cells arranged in corner portions of the honeycomb segment,
   the non-corner rim circumferential wall cells are the rim circumferential wall cells arranged in portions other than the corner portions of the honeycomb segment, and
   an inflow open area $S1_{in}$ of each corner rim circumferential wall cell is 1.1 times or more as large as an average inflow open area $S2_{in}$ of the non-corner rim circumferential wall cells, or
   an outflow open area $S1_{out}$ of the corner rim circumferential wall cell is 1.1 times or more as large as an average outflow open area $S2_{out}$ of the non-corner rim circumferential wall cells.

2. The plugged honeycomb structure according to claim 1, wherein except for a circumferential region of the honeycomb segment where the rim circumferential wall cells are formed, the plugging portions are arranged in the open ends of the cells of the honeycomb segment so that inflow cells including the plugging portions arranged in the open ends of the cells in the outflow end face surround an outflow cell including the plugging portion disposed in the open end of the cell in the inflow end face.

3. The plugged honeycomb structure according to claim 1, wherein a thickness of the segment circumferential wall is from 0.3 to 1.0 mm.

4. The plugged honeycomb structure according to claim 1, wherein a thickness of the bonding layer is from 0.5 to 1.5 mm.

5. The plugged honeycomb structure according to claim 1, wherein the cells include whole rim partition wall cells,
   the whole rim partition wall cells are the cells having whole rims of the cells which are surrounded with the partition walls in the cross section perpendicular to the cell extending direction,
   the cells including the plugging portions arranged in the open ends of the cells in the outflow end face are defined as inflow cells, and the cells including the plugging portions arranged in the open ends of the cells in the inflow end face are defined as outflow cells, and
   a shape of the corner rim circumferential wall cell that is the inflow cell is different from a shape of the whole rim partition wall cell that is the inflow cell, or
   a shape of the corner rim circumferential wall cell that is the outflow cell is different from a shape of the whole rim partition wall cell that is the outflow cell.

6. The plugged honeycomb structure according to claim 1, wherein the inflow open area $S1_{in}$ of the corner rim circumferential wall cell is smaller than 4.0 times as large as the average inflow open area $S2_{in}$ of the non-corner rim circumferential wall cells, or
   the outflow open area $S1_{out}$ of the corner rim circumferential wall cell is smaller than 4.0 times as large as the average outflow open area $S2_{out}$ of the non-corner rim circumferential wall cells.

\* \* \* \* \*